US010308158B2

(12) United States Patent
Quenzi et al.

(10) Patent No.: US 10,308,158 B2
(45) Date of Patent: Jun. 4, 2019

(54) UTILITY TRAILER WITH MOVABLE BED

(71) Applicant: Davis Village Solutions, LLC, Baraga, MI (US)

(72) Inventors: Philip J. Quenzi, Atlantic Mine, MI (US); Niel S. Somero, Chassell, MI (US); Nathan K. Somero, New Ipswich, NH (US); David M. Somero, New Ipswich, NH (US); Matthew J. Somero, Rindge, NH (US)

(73) Assignee: Davis Village Solutions, LLC, Baraga, MI (US)

( * ) Notice: Subject to any disclaimer, the term of this patent is extended or adjusted under 35 U.S.C. 154(b) by 32 days.

(21) Appl. No.: 15/204,103

(22) Filed: Jul. 7, 2016

(65) Prior Publication Data

US 2017/0008441 A1 Jan. 12, 2017

Related U.S. Application Data

(60) Provisional application No. 62/189,500, filed on Jul. 7, 2015.

(51) Int. Cl.
*B60P 1/36* (2006.01)
*B60P 1/00* (2006.01)
*B60P 1/04* (2006.01)

(52) U.S. Cl.
CPC .............. *B60P 1/365* (2013.01); *B60P 1/003* (2013.01); *B60P 1/006* (2013.01); *B60P 1/04* (2013.01)

(58) Field of Classification Search
CPC ...................................................... B60P 1/365

USPC ......................................... 414/483, 510, 521
See application file for complete search history.

(56) References Cited

U.S. PATENT DOCUMENTS

| | | | | | |
|---|---|---|---|---|---|
| 286,052 | A | * | 10/1883 | Miller ..................... | B60P 1/365 298/28 |
| 482,785 | A | * | 9/1892 | Compton ................ | B60P 1/365 414/510 |
| 507,122 | A | * | 10/1893 | Harrington ............. | B60P 1/365 414/510 |
| 788,648 | A | * | 5/1905 | Kinney ..................... | B60P 1/38 198/310 |
| 1,038,230 | A | * | 9/1912 | Tansill ..................... | B60P 1/365 298/1 R |

(Continued)

FOREIGN PATENT DOCUMENTS

| | | | | | |
|---|---|---|---|---|---|
| GB | | 2191755 A | * | 12/1987 | .............. B60P 1/365 |
| JP | | 05330376 A | * | 12/1993 | .............. B60P 1/365 |
| WO | WO 2012/035700 A1 | | * | 3/2012 | .............. B60P 1/365 |

*Primary Examiner* — James Keenan
(74) *Attorney, Agent, or Firm* — Honigman LLP

(57) ABSTRACT

A utility trailer with a movable bed floor includes a trailer frame supported by a plurality of wheel assemblies. A bed panel is coupled with the trailer frame and defines an upper support surface. A live-bed flexible member spans the length and width of the upper support surface. A load chain is coupled between forward and rearward ends of the live-bed flexible member and span the length of the bed panel below the bed panel. A drive system is supported by the trailer frame. The drive system has a sprocket engaged with the load chain and is operable to drive the live-bed flexible member in forward and rearward directions over the upper support surface for loading and unloading items from the utility trailer.

17 Claims, 38 Drawing Sheets

(56) References Cited

U.S. PATENT DOCUMENTS

| | | | | |
|---|---|---|---|---|
| 1,251,372 | A * | 12/1917 | Hewiit | B60P 1/38 239/678 |
| 2,992,750 | A * | 7/1961 | Brock | B60P 1/52 298/5 |
| 3,071,382 | A | 1/1963 | De Biasi | |
| 3,498,482 | A * | 3/1970 | Lewis | B60P 1/006 198/750.1 |
| 3,578,186 | A * | 5/1971 | Thomas | B60P 1/36 414/510 |
| 3,593,864 | A * | 7/1971 | Moser | B60P 1/38 198/811 |
| 3,991,493 | A * | 11/1976 | Orth | E02F 3/6481 37/422 |
| 4,111,318 | A * | 9/1978 | Lutz | B60P 1/006 198/817 |
| 4,133,440 | A * | 1/1979 | Heidrick, Jr. | B60P 3/07 410/66 |
| 4,162,735 | A * | 7/1979 | Lewis | B60P 1/006 414/514 |
| 4,251,064 | A * | 2/1981 | Camilleri | F16F 3/04 188/268 |
| 4,431,360 | A * | 2/1984 | Maeno | B65G 67/04 414/294 |
| 4,531,680 | A * | 7/1985 | Groeneweg | A01C 3/06 239/676 |
| 4,685,856 | A * | 8/1987 | Hesse, Jr. | B60P 1/006 198/746 |
| 4,927,316 | A * | 5/1990 | Kordel | B60P 1/365 414/510 |
| 5,170,968 | A * | 12/1992 | Helmner | B60P 1/365 198/496 |
| 5,967,733 | A * | 10/1999 | Cash | B62D 63/062 414/483 |
| 6,109,854 | A * | 8/2000 | Thompson, Jr. | B64F 1/3055 14/69.5 |
| 6,131,830 | A | 10/2000 | Jones | |
| 6,589,005 | B1 * | 7/2003 | Hull | B60P 3/07 280/456.1 |
| 6,698,997 | B2 | 3/2004 | Arne et al. | |
| 6,837,668 | B1 * | 1/2005 | Brown | B60P 1/365 414/510 |
| 7,104,478 | B2 | 9/2006 | Niemela et al. | |
| 7,293,723 | B2 | 11/2007 | Niemela et al. | |
| 8,182,194 | B2 * | 5/2012 | Pruteanu | B65F 3/041 414/510 |
| 8,197,175 | B2 | 6/2012 | Stewart et al. | |
| 8,647,044 | B2 | 2/2014 | Stewart et al. | |
| 9,021,801 | B2 * | 5/2015 | Gao | F01P 7/10 60/528 |
| 9,303,467 | B2 * | 4/2016 | Otten | E21B 19/004 |
| 2006/0045678 | A1 * | 3/2006 | Andersen | B65G 69/2817 414/401 |
| 2007/0000759 | A1 * | 1/2007 | Knapen | B60P 1/365 198/527 |
| 2007/0003398 | A1 * | 1/2007 | Hernandez | B60P 1/28 414/483 |
| 2010/0044939 | A1 * | 2/2010 | Hurwitz | F16F 1/376 267/153 |

* cited by examiner

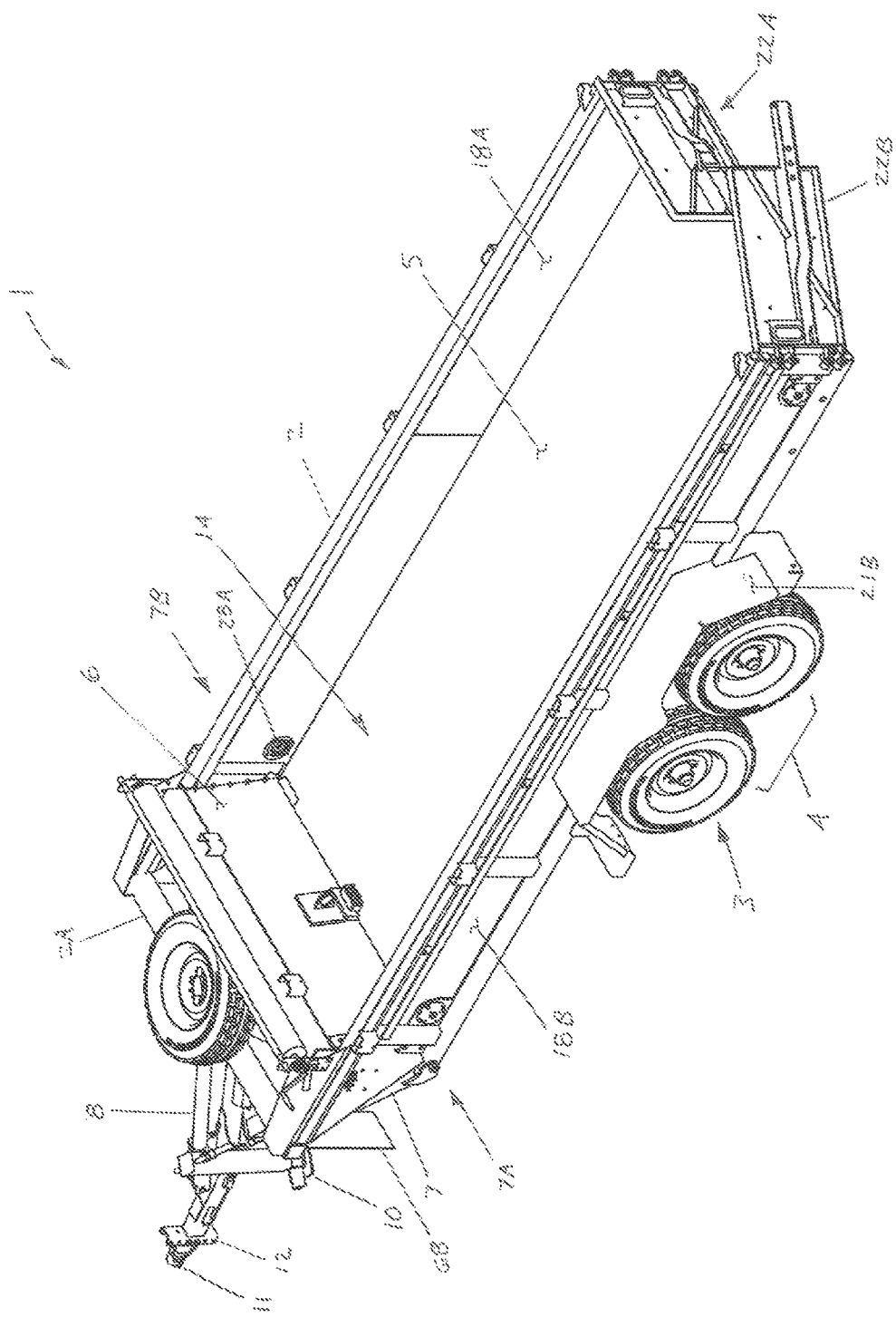

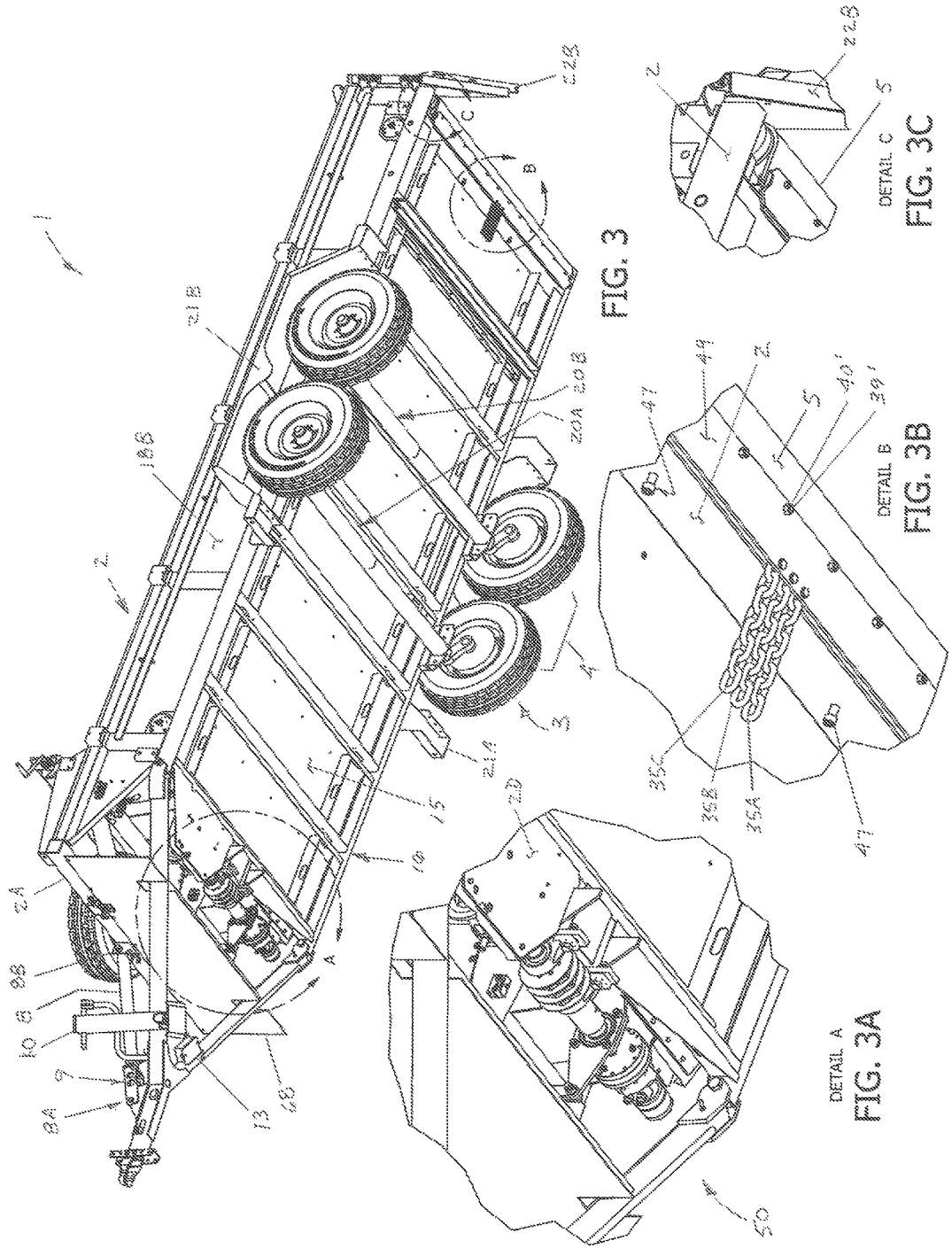

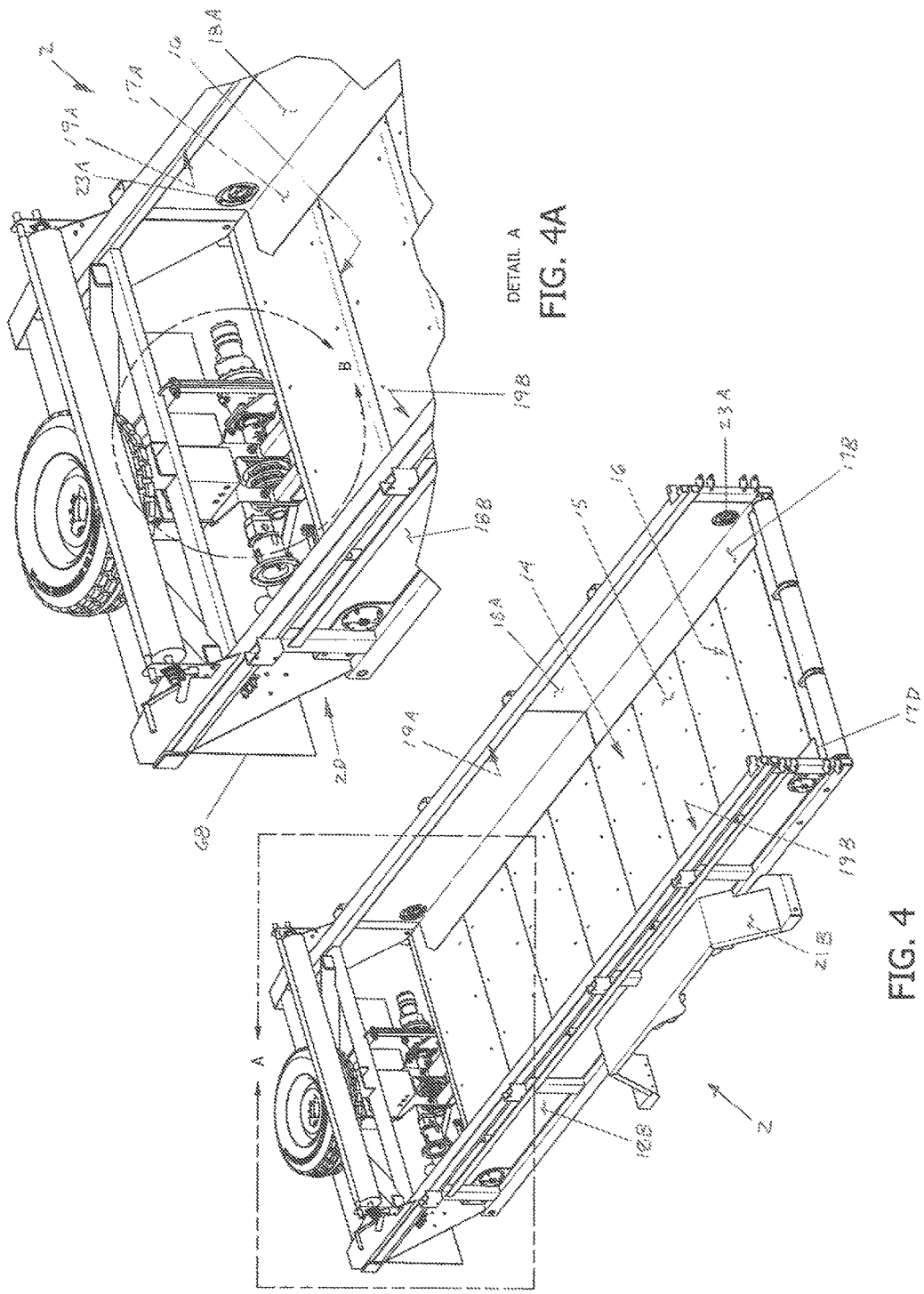

DETAIL B

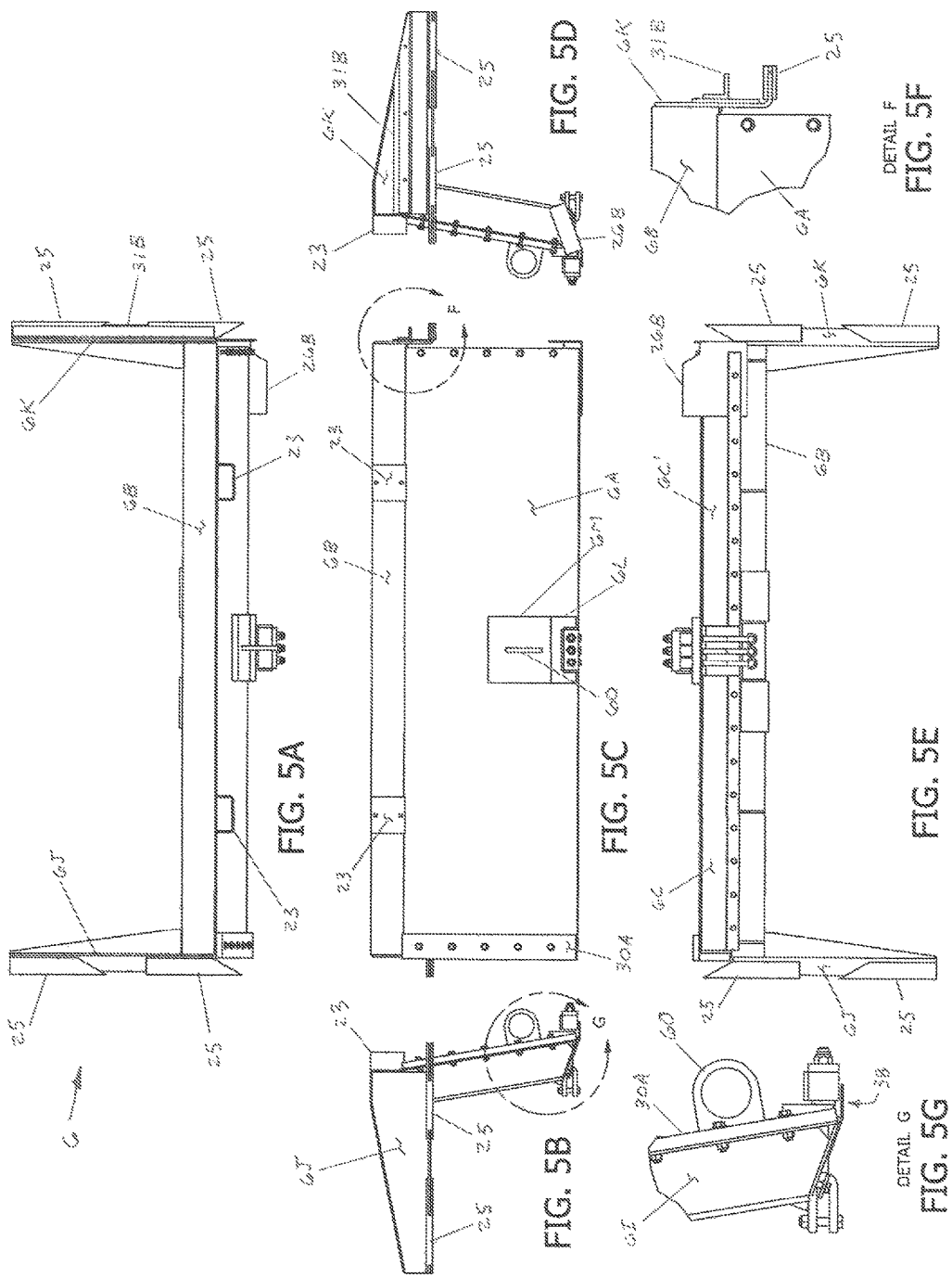

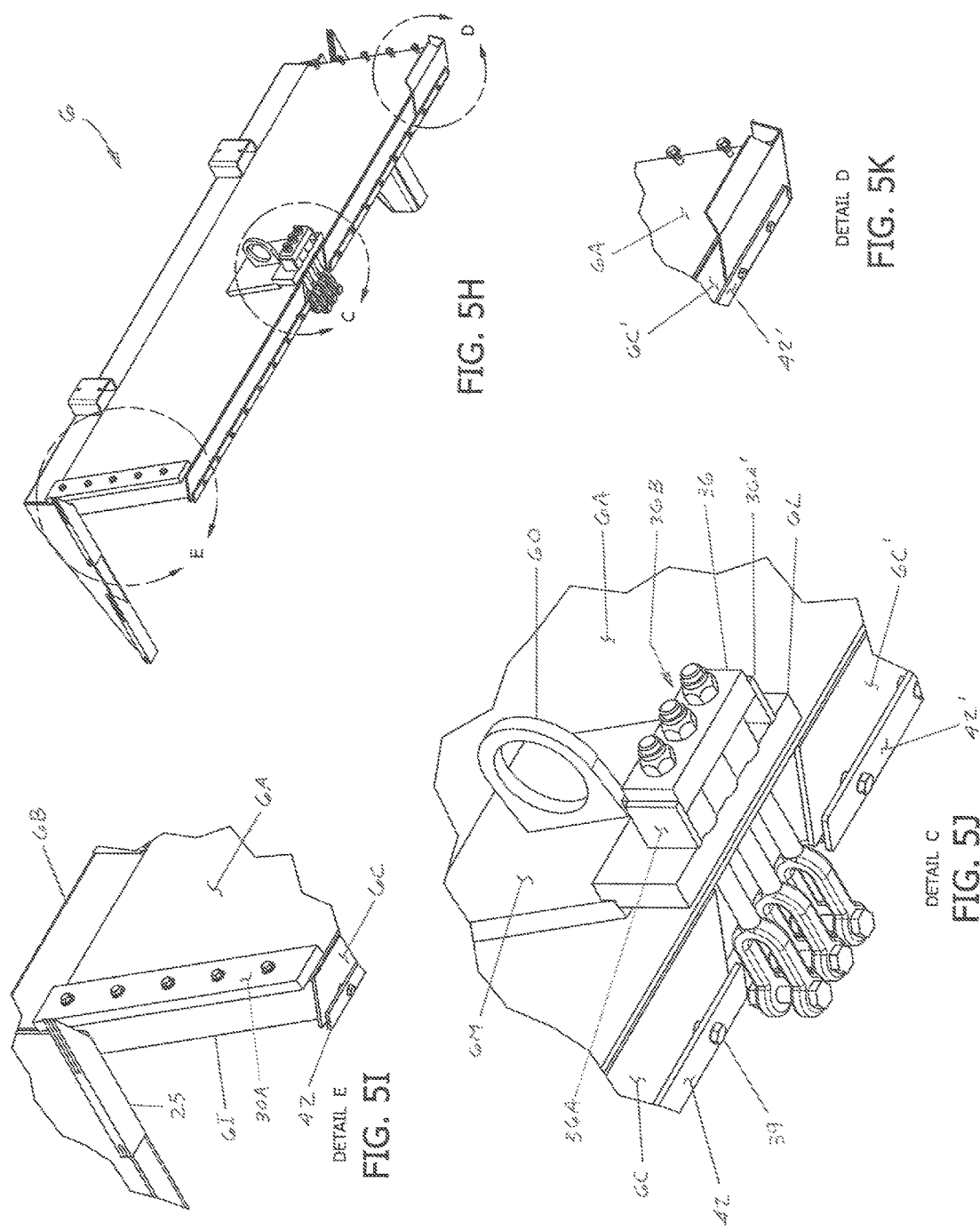

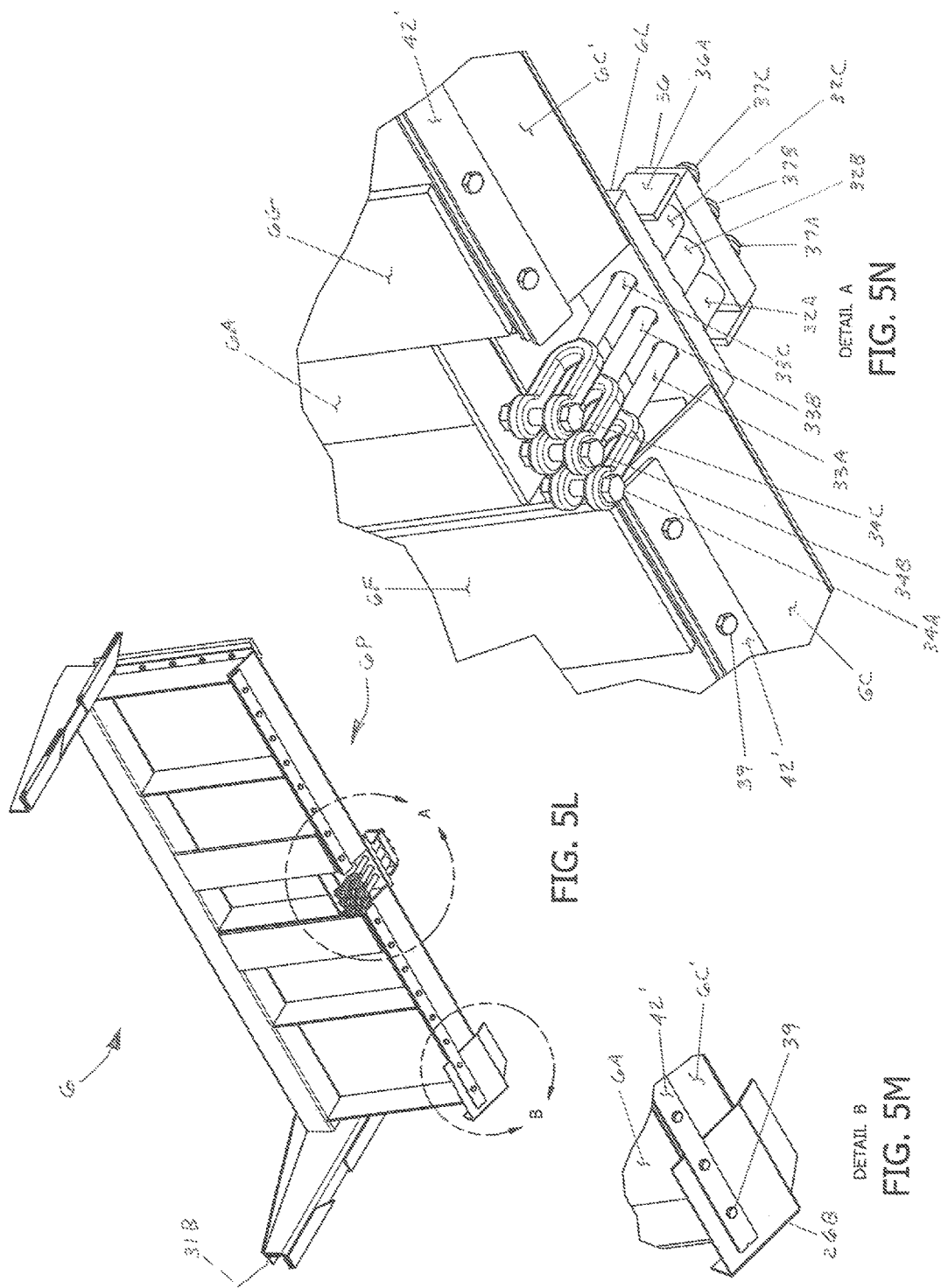

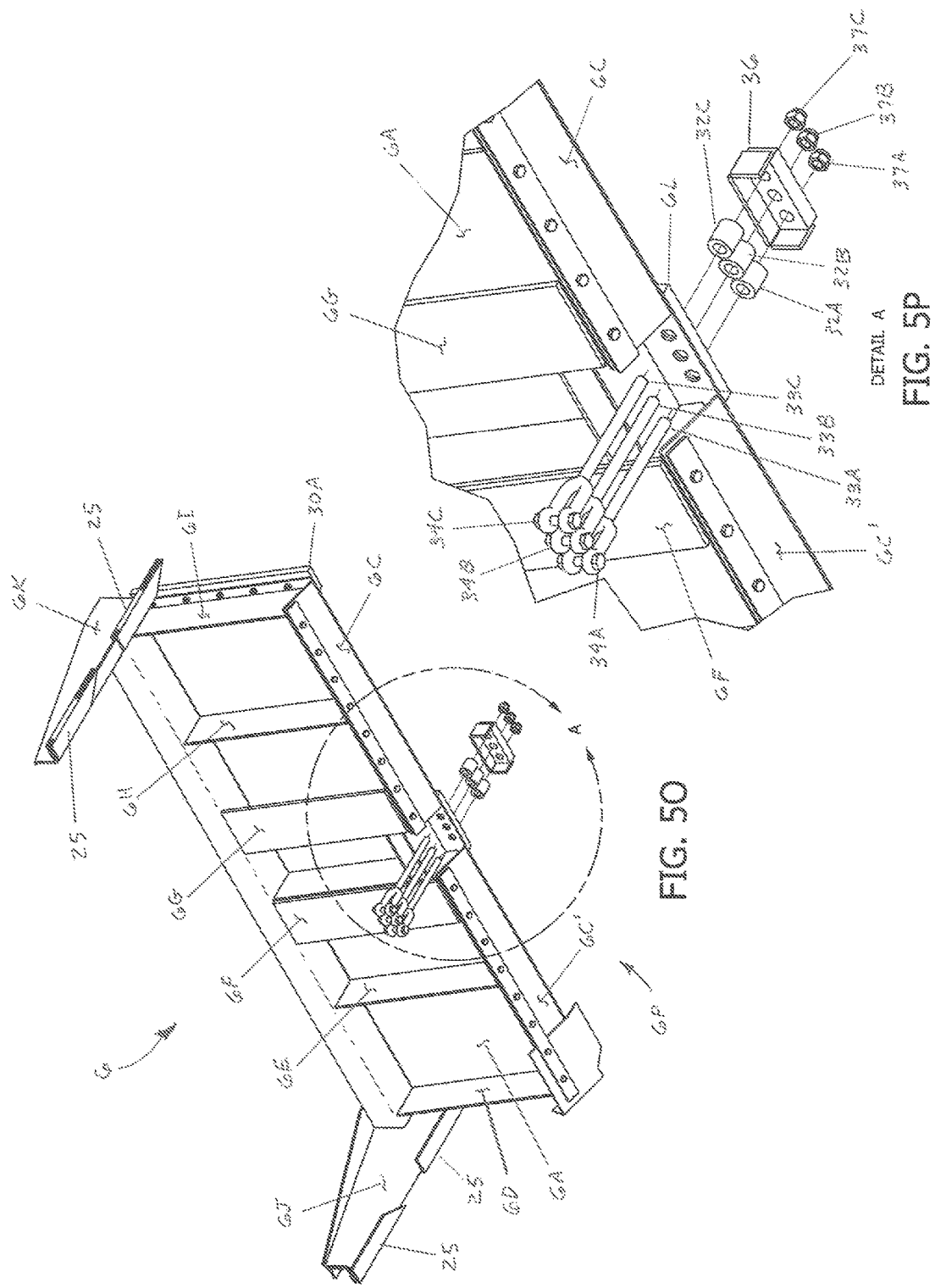

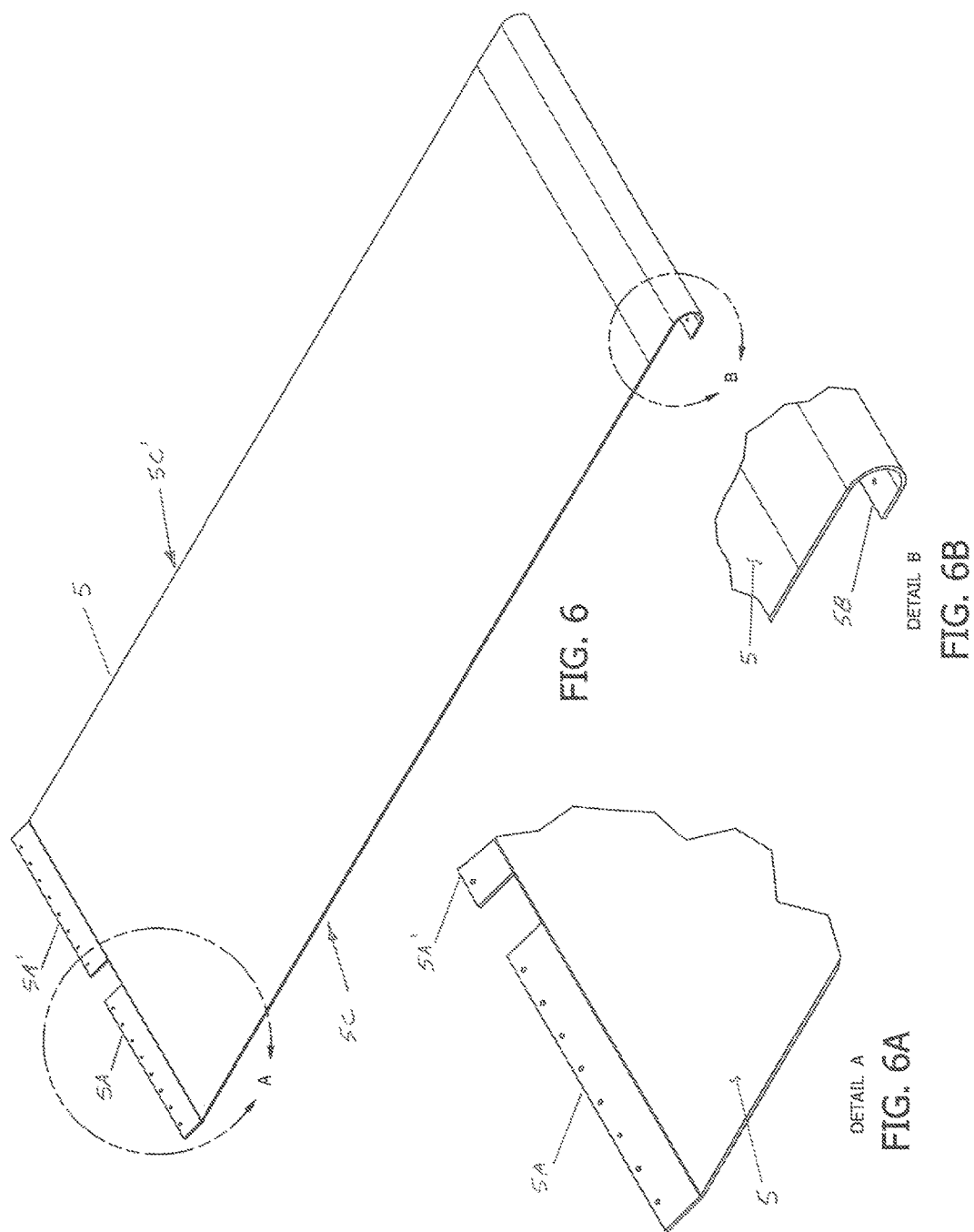

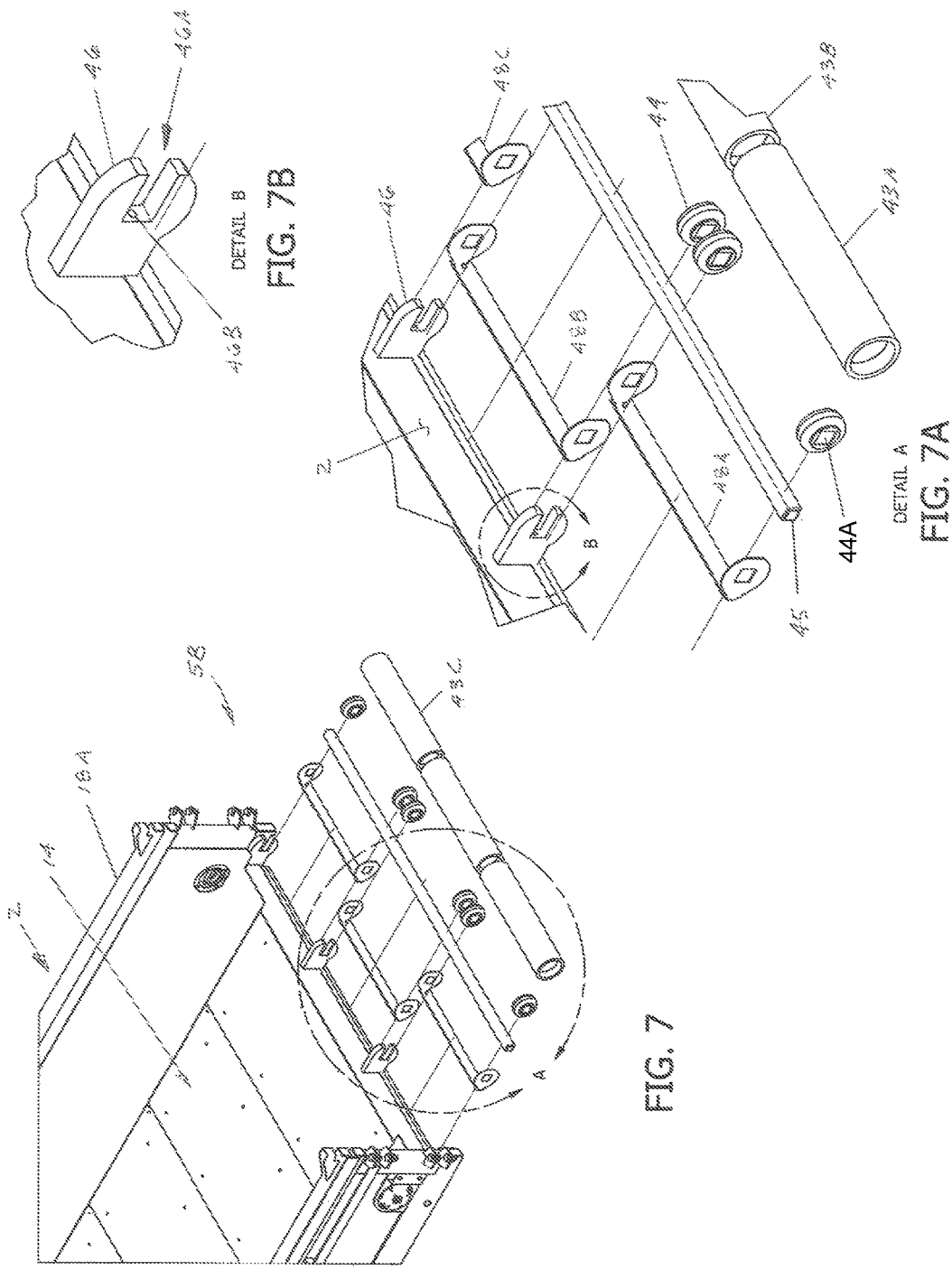

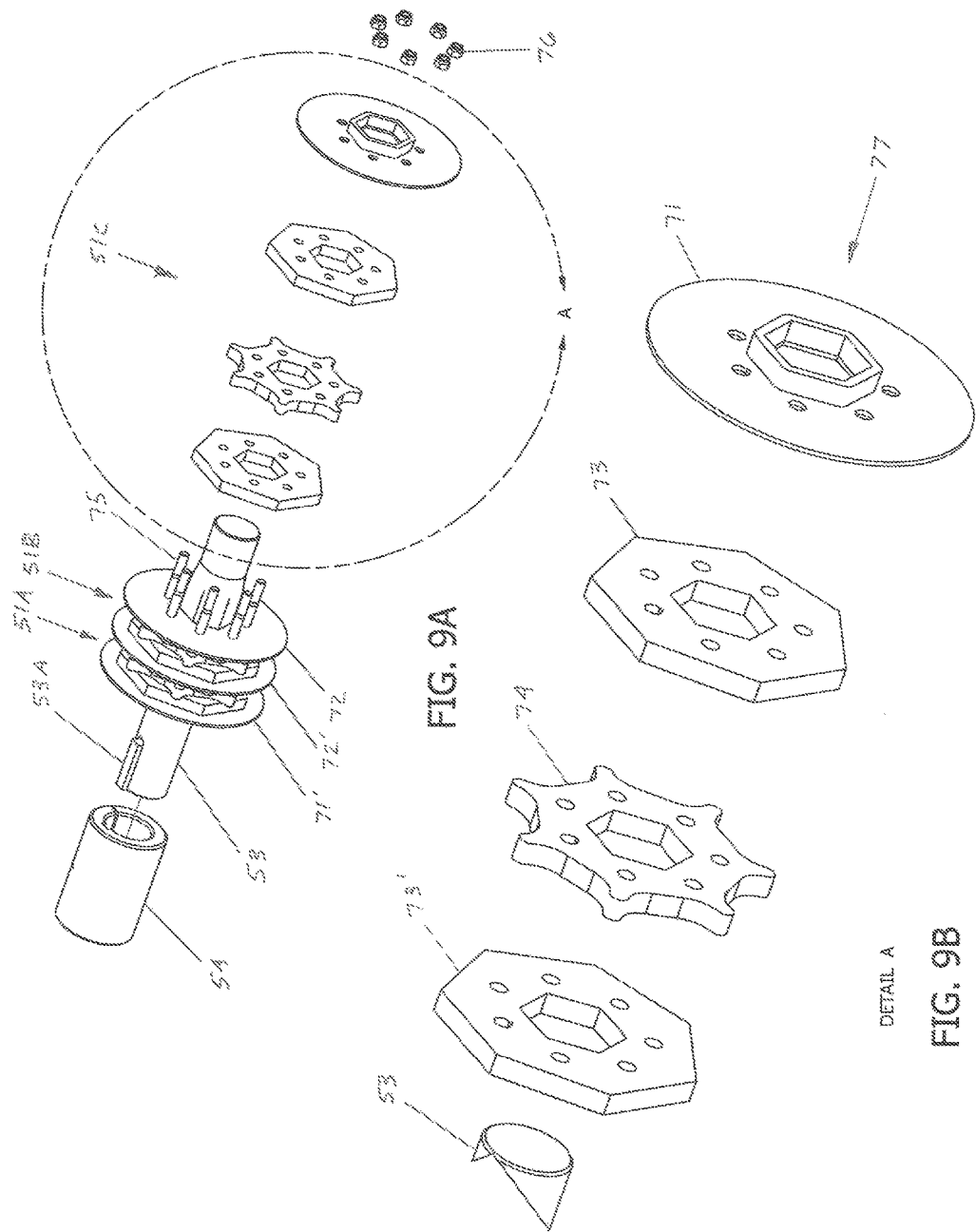

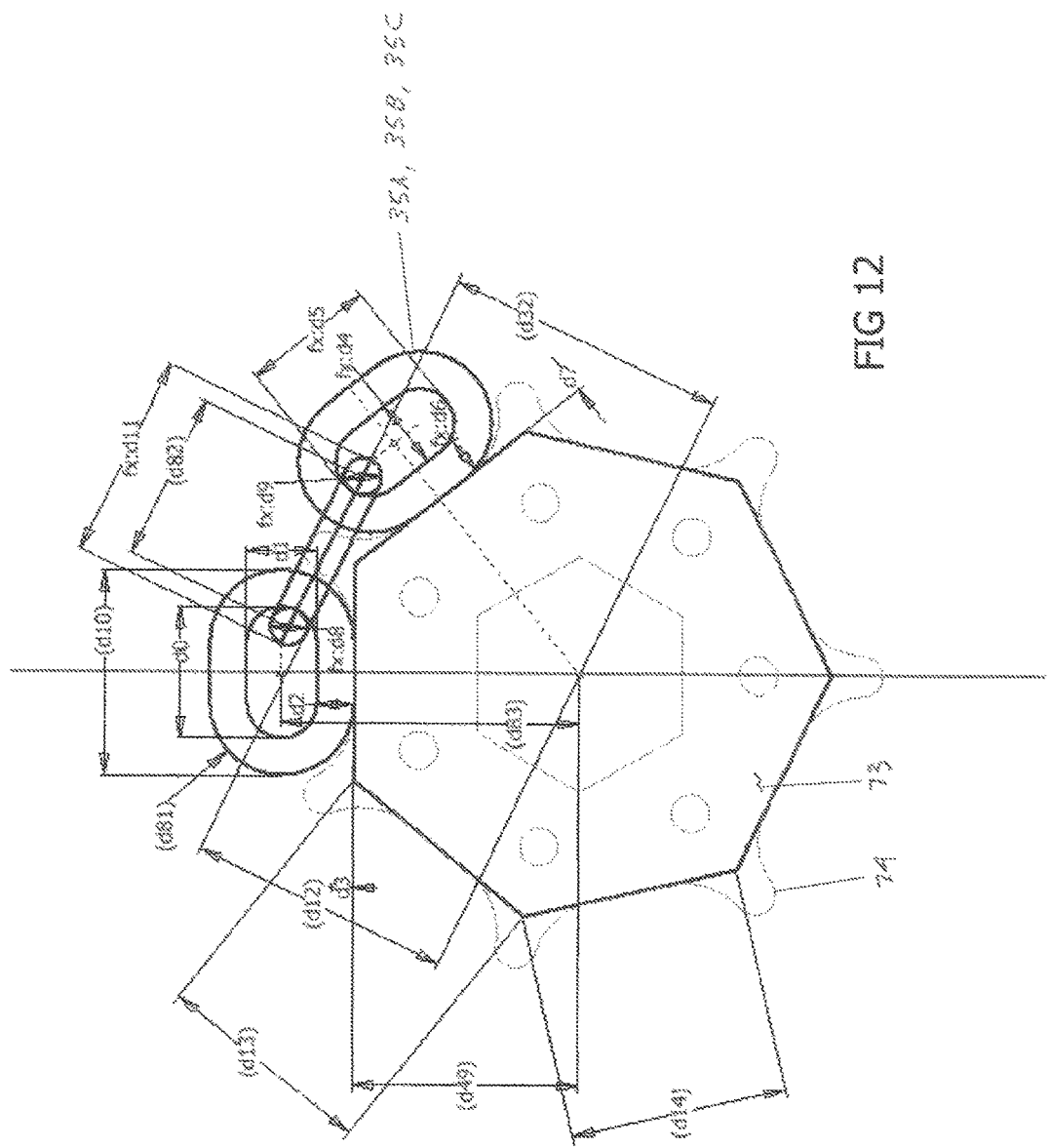

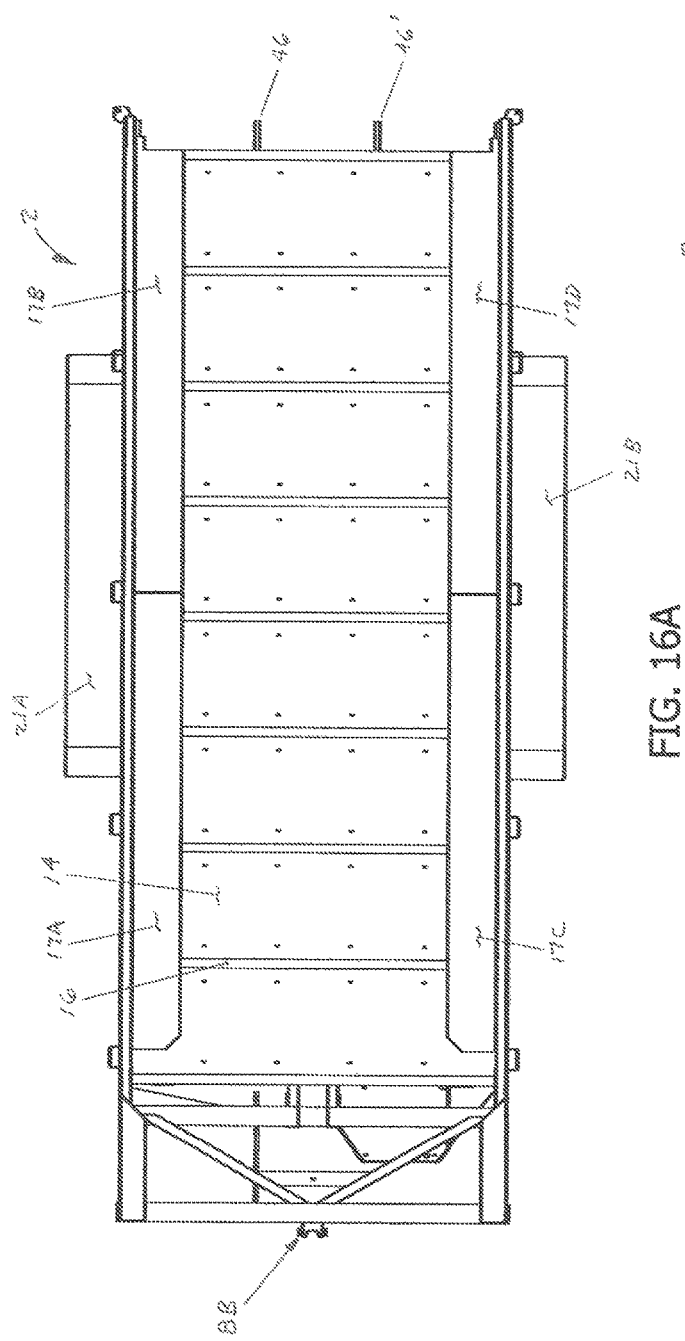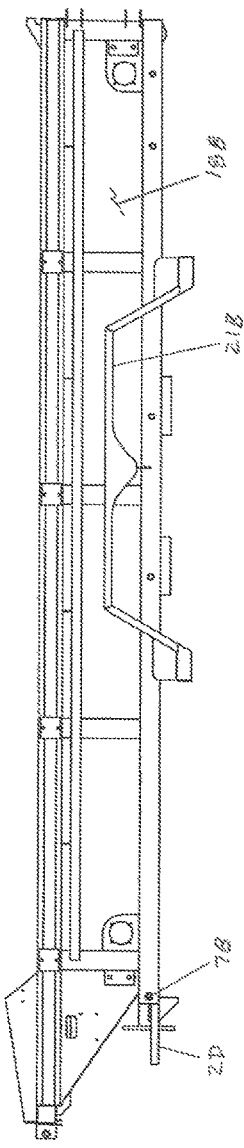

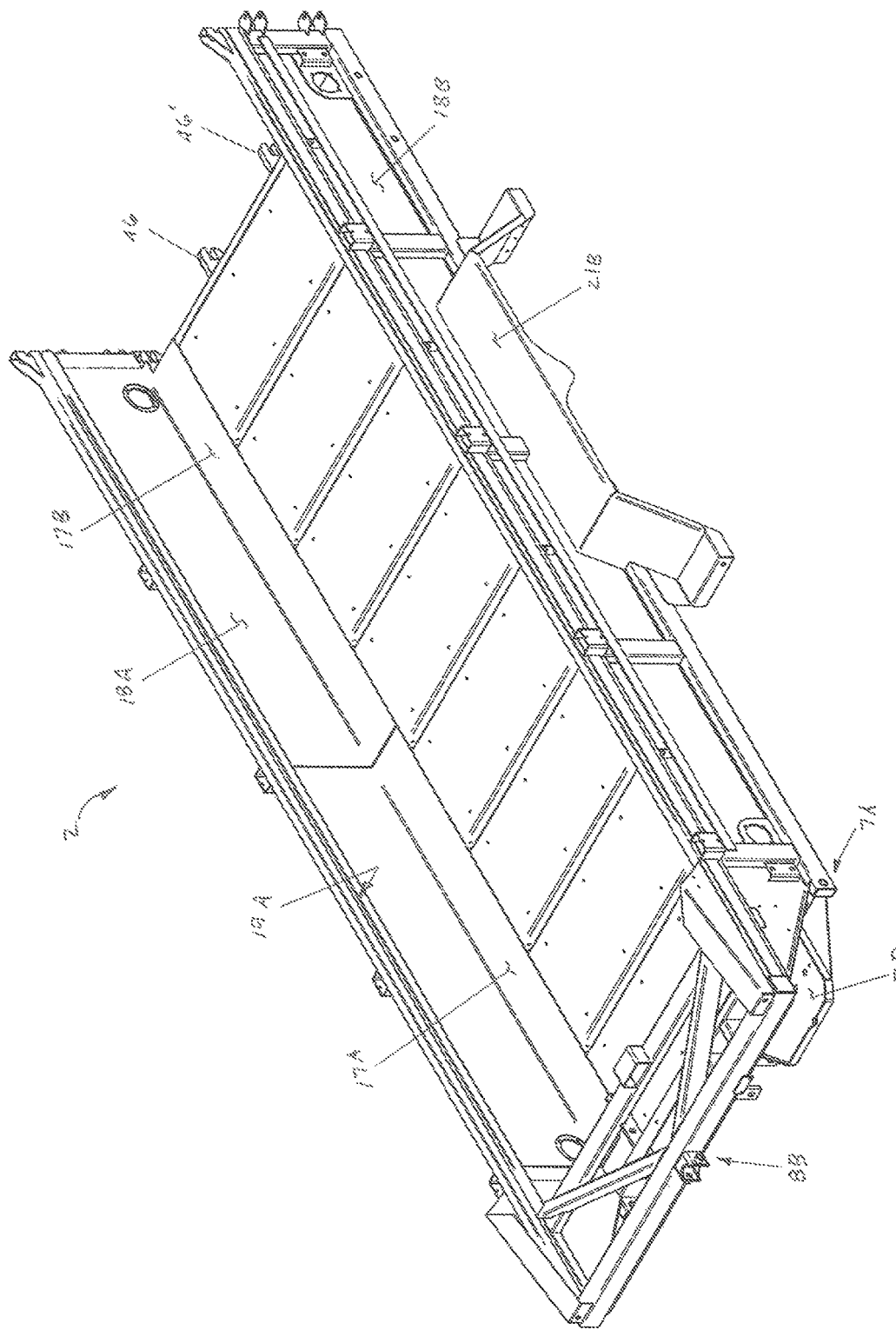

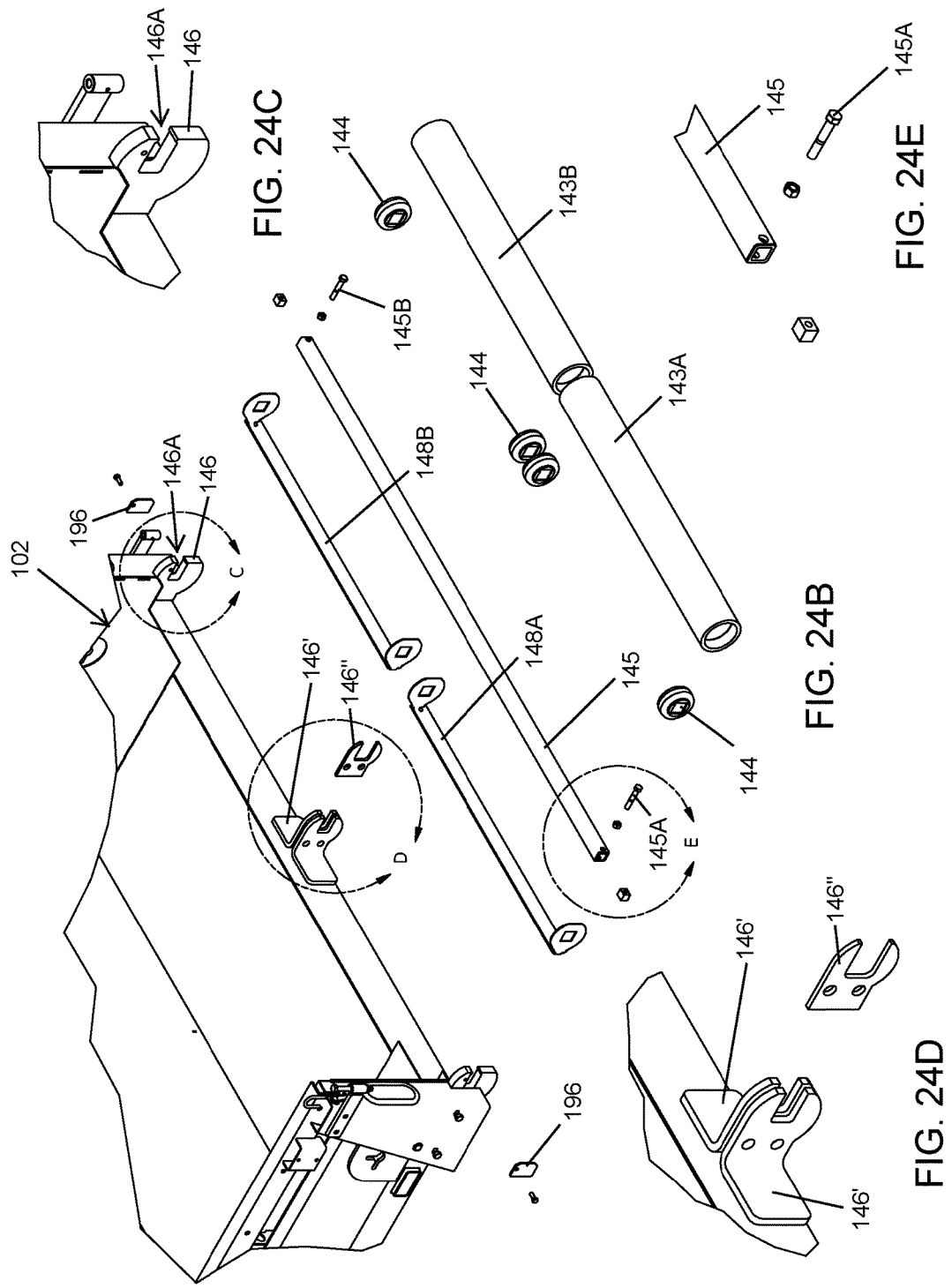

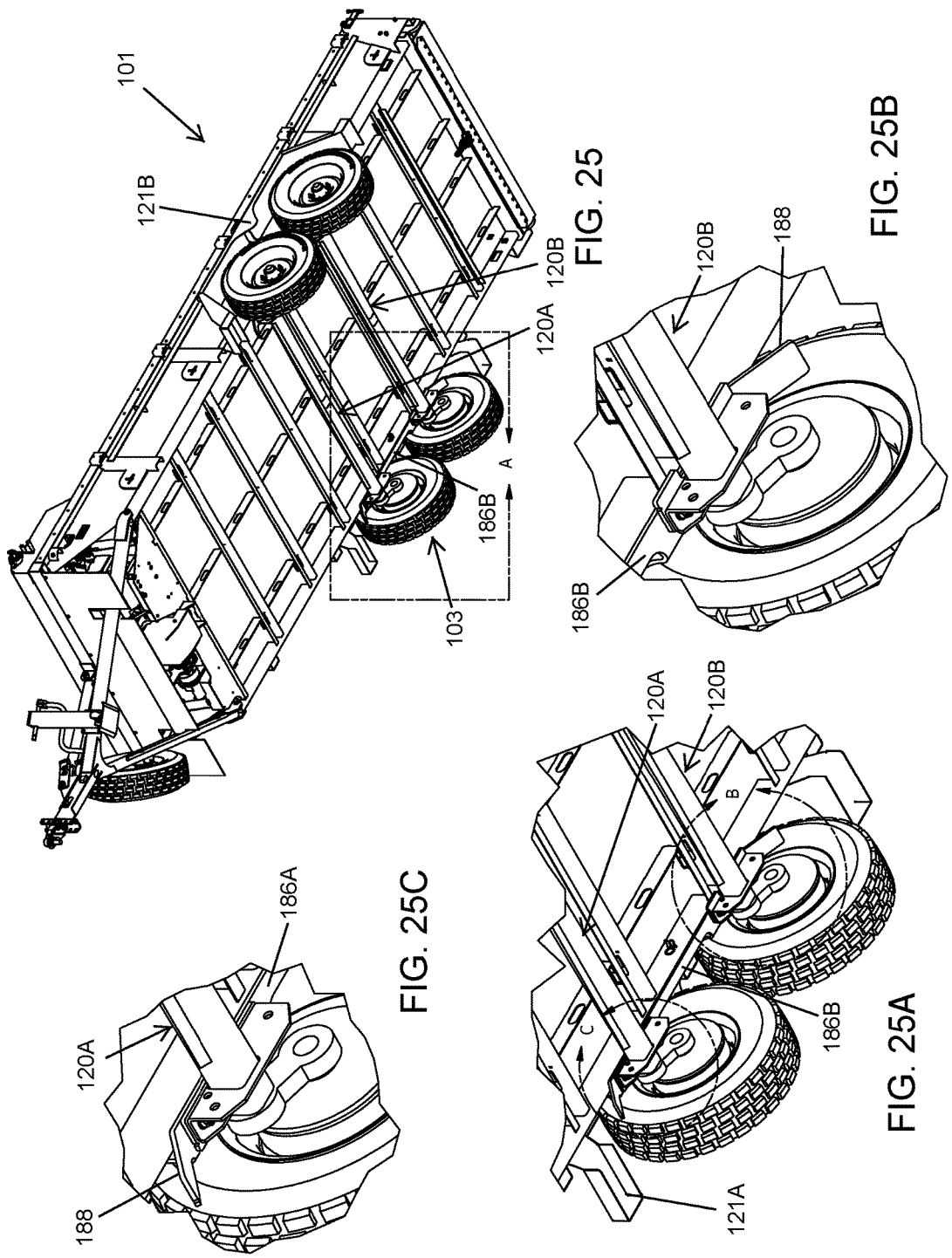

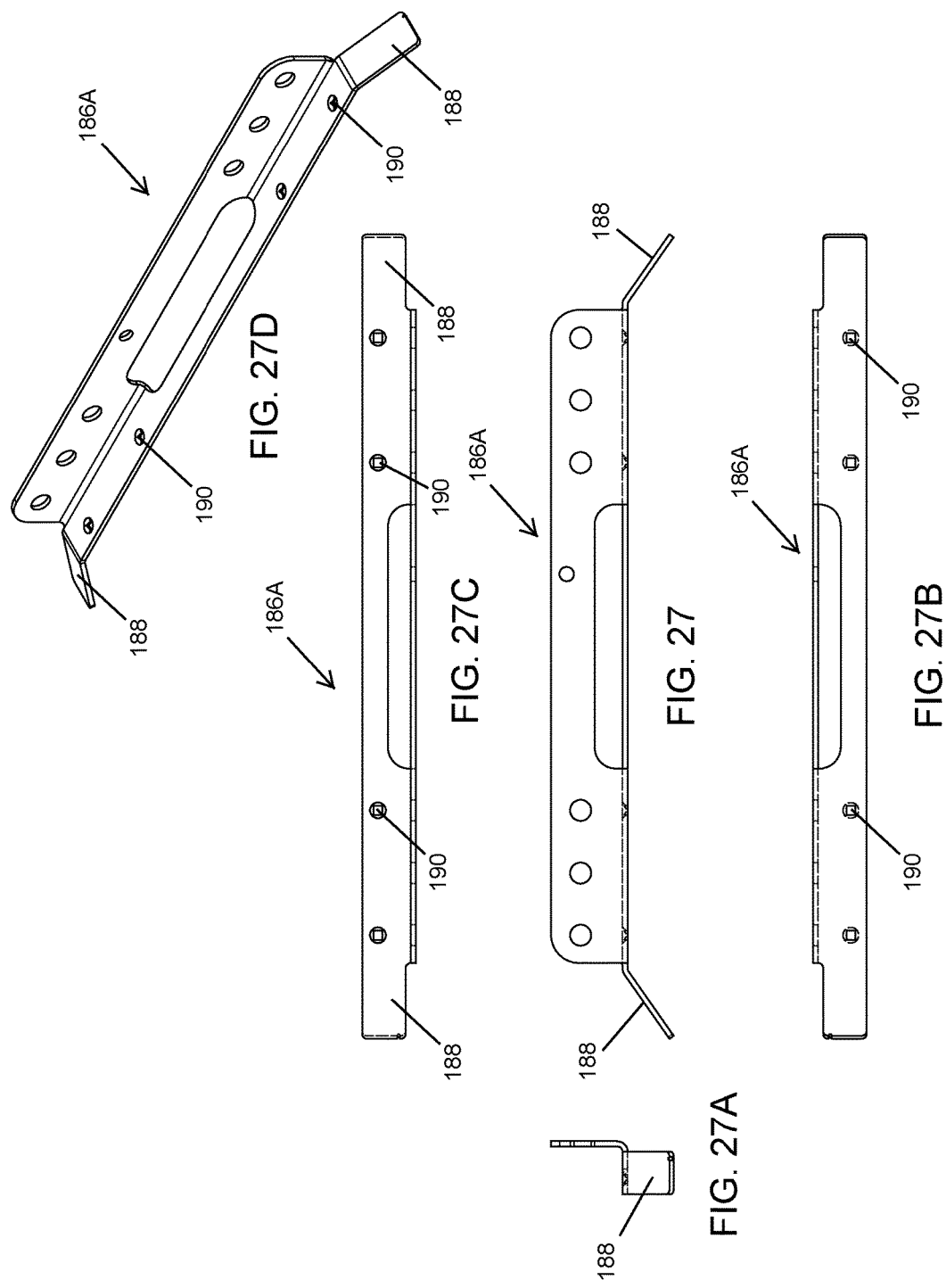

UTILITY TRAILER WITH MOVABLE BED

CROSS REFERENCE TO RELATED APPLICATION

The present application claims the filing benefits of U.S. provisional application Ser. No. 62/189,500, filed Jul. 7, 2015, which is hereby incorporated herein by reference in its entirety.

FIELD OF THE INVENTION

The present invention relates generally to the field of live-bed utility trailers, and more particularly relates to utility trailers with beds adapted to move for loading and unloading items from the trailer.

BACKGROUND OF THE INVENTION

It is generally known to provide a continuous conveyor belt extending over and under the floor of a trailer for moving trailer contents, such as rock, sand, vegetables, grain, and the like, toward the front or rear of the trailer, respectively, when loading or unloading the trailer. Similarly, it is known to provide cables over the floor of a trailer that may be pulled by winches to move trailer contents, such as boxes, pallets, and the like, toward the front or rear of the trailer, respectively, when loading or unloading the trailer.

SUMMARY OF THE INVENTION

The present invention provides an advanced live-bed utility trailer for multiple use applications and includes an expanded range of practical uses and applications. The utility trailer includes a trailer frame that is supported by a plurality of wheel assemblies and a bed panel that is coupled with the trailer frame to define an upper support surface of the trailer bed. In one embodiment, a live-bed flexible member spans the upper support surface and a set of load chains are span below the bed panel and are coupled between forward and rearward ends of the live-bed flexible member. A drive system may engage the load chains is operable to drive the live-bed flexible member in forward and rearward directions over the upper support surface for loading and unloading items from the utility trailer. The utility trailer of the present invention provides a unique combination of simplicity, reasonably low cost to manufacture, and ease-of-use self-loading, transport and self-unloading capabilities.

Optionally, the utility trailer may include a bulkhead assembly that is coupled between the forward end of the live-bed flexible member and a rear end of the load chains to define a mechanical loop that is driven by the drive system to move the bulkhead assembly with the live-bed flexible member.

Optionally, the utility trailer may include a drawbar assembly that is pivotally coupled with a front end of the trailer frame about a horizontal axis, such that a linear adjustment device may be coupled between the drawbar assembly and the trailer frame and linearly actuated to adjust the angle of the drawbar assembly relative to the trailer frame for adjusting a height of a rear of the trailer frame from a ground surface.

These and other objects, advantages, purposes and features of the present invention will become apparent upon review of the following specification in conjunction with the drawings.

BRIEF DESCRIPTION OF THE DRAWINGS

FIG. 2 is a three-quarter left-rear upper perspective view of the live-bed utility trailer of FIG. 1;

FIG. 3 is a three-quarter left-front lower perspective view of the live-bed utility trailer of FIG. 1;

FIG. 3A is a detailed perspective view of a portion of the live-bed flexible member mechanical drive system shown at section A of FIG. 3;

FIG. 3B is a detailed perspective view of the closed-link load chains attachments to the lower portion of the live-bed flexible member shown at section B of FIG. 3;

FIG. 3C is a detailed perspective view of the rear end-portion of the live-bed utility trailer and live-bed flexible member shown at section C of FIG. 3;

FIG. 4 is a three-quarter left-rear upper perspective view of the trailer main frame welded assembly and the live-bed flexible member mechanical drive system shown at the forward portion of the main frame;

FIG. 4A is a detailed view of the live-bed flexible member mechanical drive system shown at the forward portion of the main frame;

FIG. 5A is a top plan view of the live-bulkhead assembly shown in FIG. 5;

FIG. 5B is a left side elevational view of the live-bulkhead assembly shown in FIG. 5;

FIG. 5C is a rear elevational view of the live-bulkhead assembly shown in FIG. 5;

FIG. 5D is a right side elevational view of the live-bulkhead assembly shown in FIG. 5;

FIG. 5E is a bottom plan view of the live-bulkhead assembly shown in FIG. 5;

FIG. 5F is a detailed elevational view of the upper right portion of the live-bulkhead assembly shown at section F of FIG. 5C;

FIG. 5G is a detailed elevational view of the lower portion of the left side of the live-bulkhead assembly shown at section C of FIG. 5B;

FIG. 5H is a lower-left-rear perspective view of the live-bulkhead assembly shown in FIG. 5;

FIG. 5I is a detailed perspective view of the left portion of the live-bulkhead assembly shown at section E of FIG. 5H;

FIG. 5J is a detailed perspective view of the central portion of the live-bulkhead assembly shown at section C of FIG. 5H;

FIG. 5K is a detailed perspective view of the right-lower portion of the live-bulkhead assembly shown at section D of FIG. 5H;

FIG. 5L is a lower-left perspective view of the live-bulkhead assembly shown in FIG. 5;

FIG. 5M is a detailed perspective view of the lower right portion of the live-bulkhead assembly shown at section B of FIG. 5L;

FIG. 5N is a detailed perspective view of the central portion of the live-bulkhead assembly shown at section A of FIG. 5L;

FIG. 5O is a lower-left perspective view of the live-bulkhead assembly shown in FIG. 5L showing an exploded view of the drive chain clevis couplings and attachment components;

FIG. 5P is a detailed perspective view of the drive chain clevis couplings and attachment components shown at section A of FIG. 5O;

FIG. 6 is a three-quarter left-rear upper perspective view of the live-bed flexible member;

FIG. 6A is a detailed perspective view of a forward portion of the live-bed flexible member shown at section A of FIG. 6;

FIG. 6B is a detailed perspective view of a rear portion of the live-bed flexible member shown at section B of FIG. 6;

FIG. 7 is a left-rear upper perspective view of the rear-most end of trailer main frame showing the live-bed cylindrical rolling member components and attachments;

FIG. 7A is a detail perspective view of the live-bed cylindrical rolling member components and attachments shown at section A of FIG. 7;

FIG. 7B is a detailed perspective view of the attachment to the frame shown at section B of FIG. 7A;

FIG. 9A is a partial exploded perspective view of the load chain drive sprockets, drive sprocket main shaft, and drive shaft main coupling also shown in FIG. 9;

FIG. 9B is a detailed perspective view of the exploded portion of the load chain drive sprocket assembly shown at section A of FIG. 9A;

FIG. 12 is a geometrical engineering layout example representation of the relationship for engagement between the load chain drive sprocket(s) design and a selected commercially available closed-link load chain of current industry standard or as-manufactured standard dimensions;

FIG. 16 is a left side elevational view of the trailer main frame shown in FIGS. 1-3;

FIG. 16A is a top plan view of the trailer main frame shown in FIG. 16;

FIG. 16B is a three-quarter left-front upper perspective view of the trailer main frame shown in FIG. 16;

FIGS. 22A-22C are detailed perspective views of portions of the live-bed utility trailer shown in FIG. 22, taken at the corresponding sections A, B, and C of FIG. 22;

FIG. 24B is an exploded left-rear upper perspective view of the rear-most end of the trailer main frame, showing the live-bed cylindrical rolling member components and attachments;

FIG. 24C is a detail perspective view of the live-bed cylindrical rolling member components and attachments shown at section C of FIG. 24B;

FIG. 24D is a detail perspective view of central "L-brackets" for supporting the live-bed cylindrical rear rollers shown at section D of FIG. 24B;

FIG. 24E is a detail perspective view of an outer brackets for supporting the live-bed cylindrical rear rollers shown at section E of FIG. 24B;

FIG. 25 is a three-quarter left-front lower perspective view of the live-bed utility trailer of FIG. 20;

FIG. 25A is a detailed perspective view of an axle mounting system of the live-bed utility trailer, taken at section A of FIG. 25;

FIGS. 25B-25C are detailed perspective views of portions of axle mounting brackets of the axle mounting system shown in FIG. 25A, taken at respective sections B and C of FIG. 25A;

FIG. 27 is a left side elevational view of an axle mounting bracket of the trailer frame assembly shown in FIG. 26;

FIG. 27A is an end elevational view of the axle mounting bracket shown in FIG. 27;

FIG. 27B is a bottom plan view of the axle mounting bracket shown in FIG. 27;

FIG. 27C is a top plan view of the axle mounting bracket shown in FIG. 27;

FIG. 27D is an upper perspective view of the axle mounting bracket shown in FIG. 27;

DESCRIPTION OF THE PREFERRED EMBODIMENTS

Figure 1:
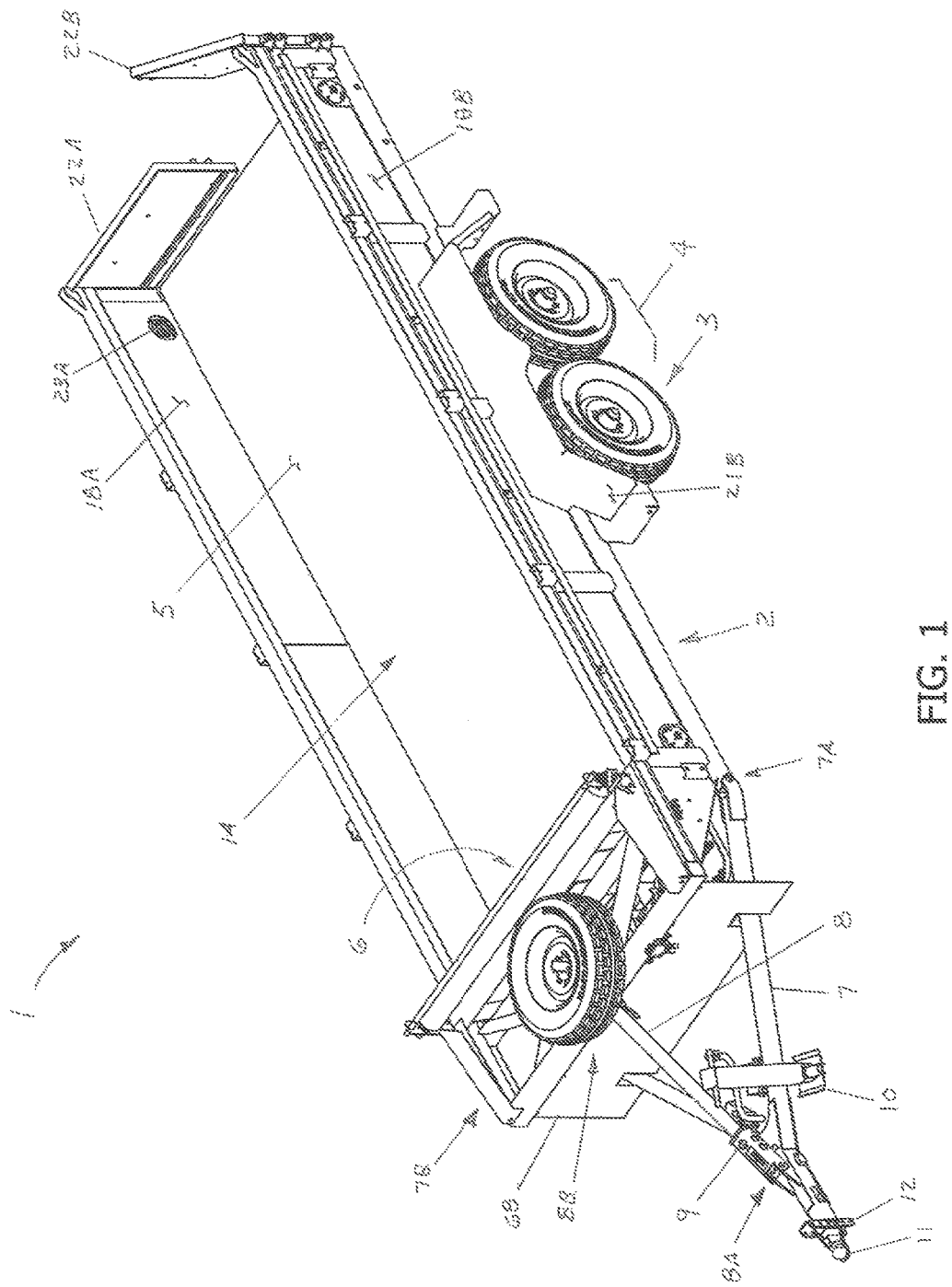
FIG. 1 is a three-quarter left-front upper perspective view of a live-bed utility trailer in accordance with one embodiment of the present invention.

Referring now to the drawings and the illustrative embodiments depicted therein, a movable bed or live-bed or live-bottom utility trailer 1, as shown in FIGS. 1 and 2, is generally comprised of a trailer main frame 2, a set of wheel and tire assemblies 3, each attached to a respective axle assembly 4, such as four wheel and tire assemblies for configuring a tandem axle design. The axle assemblies 4 generally support the trailer main frame 2, which further supports a powered movable live-bed flexible member 5. The trailer main frame 2 may be comprised of welded structural steel. The live-bed utility trailer 1 is generally intended for use to transport and carry all foreseeable varieties of materials and equipment either off-road or over the highway or other roads or the like, as desired. In particular, the utility trailer described herein offers the unique capability and benefits of allowing or at least facilitating both self-loading and self-unloading operations of materials and equipment, without the need for other or additional powered equipment in a variety of applications. The live-bed utility trailer may be hitched to or otherwise connected and towed by either on or off highway vehicles as desired for engagement in a wide variety of practical tasks and beneficial material transport methods and applications.

In addition to the movable live-bed flexible member 5 shown in FIGS. 1 and 2, an additional structural feature includes a movable or live-bulkhead assembly 6 which is mechanically attached to and slides with the live-bed flexible member as it moves under controlled power operation to on-load and off-load materials and equipment onto and off of the trailer bed support surface to move both forward and rearward with movement of the live-bed flexible member 6.

Figure 15:
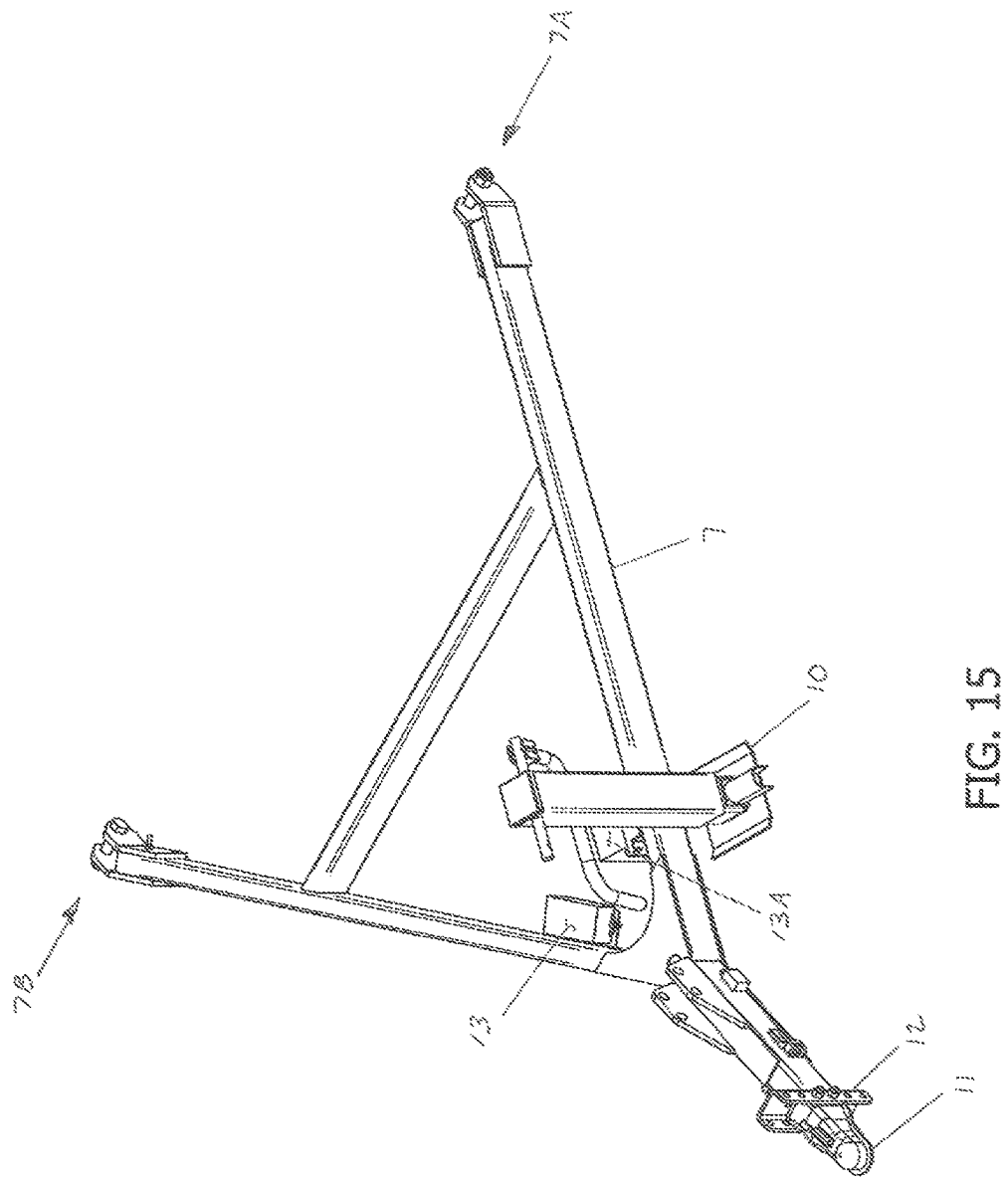
FIG. 15 is a detail perspective view of the drawbar assembly shown in FIGS. 1-3.
Figure 16C:
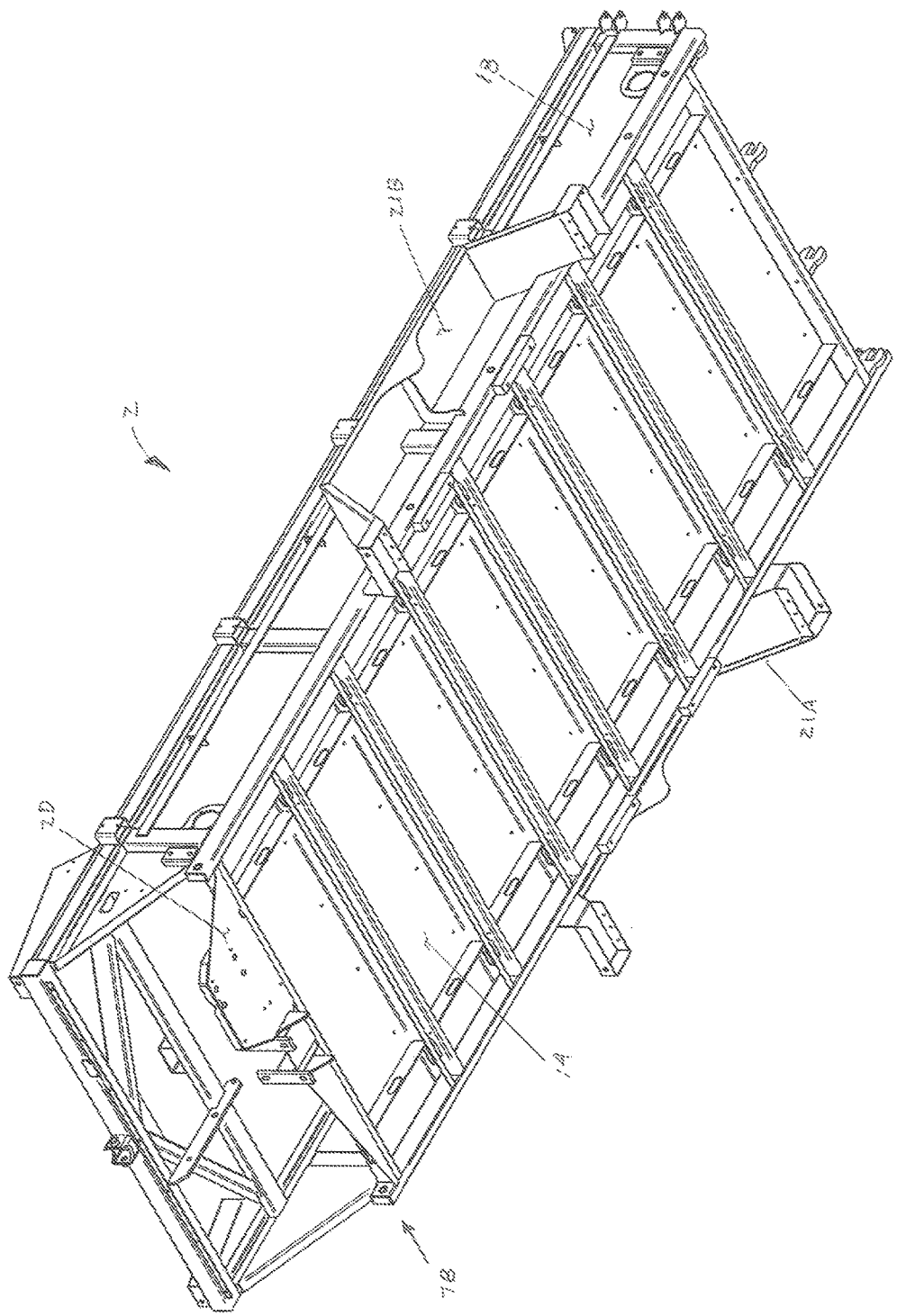
FIG. 16C is a three-quarter left-front lower perspective view of the trailer main frame shown in FIG. 16.

The front portion of the trailer is comprised of the drawbar assembly 7 having the general shape of an A-frame and pivotally attached at two locations 7A and 7B at the forward end of the trailer main frame 2. The two pivotal axes 7A and 7B of are aligned such that the respective axes are substantially horizontal and substantially coincident to one another. This provides a single axis of free pivotal movement of the structural drawbar assembly 6 about the two common pivotal axes with respect to the trailer main frame 2. FIG. 15 shows additional detail related to the drawbar assembly 7. Like the main frame 2, the drawbar assembly may be comprised of structural welded steel.

The position of the drawbar assembly 7 with respect to the trailer main frame 2 is held by an adjustable linear actuator, such as a drawbar hydraulic cylinder 8 pivotally attached at each of its two respective ends; attaching the cylinder forward end 8A at the drawbar assembly 7 and attaching the cylinder rearward end 8B at the central portion of the upper front cross member 2A of the trailer main frame 2. The hydraulic cylinder 8 is preferably a long-stroke design suited for good mechanical lateral stability whenever the cylinder 8 is mostly or otherwise fully extended.

The function of the hydraulic cylinder 8 is to extend and retract as needed through the use of hydraulic power for the purpose of adjusting the longitudinal tilt angle of the trailer main frame 2 with respect to ground level. Adjustment of the trailer longitudinal tilt becomes highly useful for facilitating trailer loading and unloading operations. At the forward end 8A of the hydraulic cylinder 8, a cylinder stroke limiter 9 is comprised of a pivotable member that can be locked or otherwise secured in place by a pin or fastener for selective mechanical engagement or disengagement with the main body of the hydraulic cylinder 8. The purpose of this stroke limiter 9 is to provide a mechanically positive stop for the purpose of preventing the movement of the cylinder rod and any inadvertent retraction of the hydraulic cylinder 8, for instance, should hydraulic fluid leakage or migration happen occur within the cylinder itself. Therefore, the cylinder stroke limiter 9 serves to prevent the possibility of movement of the cylinder rod and tilting of the trailer main frame 2 when the trailer is subject to loads, parked, or during transport and towing operations. It is contemplated that the adjustable linear actuator may comprise an additional or alternative type of pneumatic cylinder or threaded adjustment device within the scope of the present invention.

The drawbar assembly 6 may also include a mechanical crank-operated trailer parking jack 10 for the purpose of supporting the trailer while it is being parked or otherwise separated from the tow vehicle. The forward end of the drawbar assembly 6 includes a trailer hitch coupler assembly 11 that is securely fastened to a structural vertical member 12 having a vertical series of mounting holes to secure the hitch coupler assembly 11. This provides the option to correctly adjust the vertical height of the trailer hitch coupler assembly 11 to generally match the height of the tow vehicle trailer hitch (not shown) as needed to maintain the approximate proper degree of levelness of the trailer main frame 2 with respect to the ground. This adjustment helps to ensure for the proper operation of the utility trailer and its beneficial functions when as different tow vehicles and trailer hitch heights are encountered.

A weather-resistant electrical box 13 containing a commercially available trailer break-away safety device and other trailer electrical connections and wiring circuit terminals interface is also mounted to the drawbar assembly 6. Other weather-resistant electrical accessory boxes may also be mounted to the inner portions of the drawbar assembly, as shown in FIG. 3.

The main structural frame 2 of the live-bed trailer 1 is most readily shown in FIGS. 1, 2, 3, 4, 4A, 16, 16A, 16B, and 16C. The main structural frame 2 is generally comprised of typical structural steel shapes and formed sheet metal, including angles, square tubing, and bar stock for example. Also included are sub-sections or areas of flat or otherwise bent and formed sheet metal, cut and sized appropriately for close-fitting structural strength of the final assembly. The main structural frame assembly 2 includes an extensive series of and a variety of welded joints to provide a secure and reliable level of design strength toward the accommodation of various anticipated design loads and intended uses.

The bed support surface 14 of the trailer main frame 2 is primarily comprised of at least one bed panel 15, and in the illustrated embodiment eight steel sheet metal bed panels 15, having downward bends at both the forward and trailing ends of each panel. These bends provide a significant increase in the bending strength of the panels, such that significant vertical loads may be supported from above. Seven relatively wide lateral gaps 16 or spaces between each of the panels are provided in the depicted embodiment to help allow debris and foreign materials readily escape downward through gaps by the force of gravity, should any such material happen to become lodged between the live-bed flexible member 5 and the stationary sheet metal bed panels 15.

Longitudinal horizontal plates 17A, 17B, 17C, and 17D may also be provided along the first and second structural vertical side walls 18A and 18B and along the bed support surfaces 14 to provide a generally smooth-sliding and debris sealing surface for movement or sliding motion of the live-bed flexible member 5 relative to the bed support surface 14. The longitudinal horizontal plates 17A, 17B, 17C, and 17D, as shown in FIGS. 4 and 4A, are laid horizontally flat inside and along the inside base corners of the side walls of the trailer. These longitudinal plates are securely welded to the frame and help to provide additional strength to the entire structure. Further they provide a smooth and generally uninterrupted surface for the bottom face and edges of the live-bed sliding bed member of the trailer to rest upon, providing continuous support on a relatively low-friction steel surface. The four longitudinal plates also provide an effective self-sealing effect between the underside outer edges of the live-bed member and the stationary structural bed face of the trailer, preventing loose materials from becoming lodged between the live-bed member and the bed support surface, such as when sand or gravel are transported.

The structural vertical side walls 18A and 18B of the trailer are comprised of structural tubing and predominantly flat sheets of steel welded securely together. The upper most portions of the left and right structural vertical side walls 18A and 18B are fabricated using structural square steel tubing to form a longitudinal and substantially parallel horizontal channels or internal tracks 19A and 19B, respectively within and at each side of the interior portions of the structural vertical side walls 18A and 18B of the trailer main frame 2. These internal tracks are designed to accept and slidably support the live-bulkhead assembly 6 by means of extended portions or live-bulkhead upper slide bearing supports 6J and 6K, respectively at each side of the live-bulkhead assembly 6 as it moves fore and aft under power within the bed portion of the trailer. The live-bulkhead upper slide bearing supports 6J and 6K and the four identical upper support linear slide bearings 25 of the live-bulkhead assembly 6 are designed for smooth low-friction sliding action in either direction within the parallel interior tracks 19A and 19B of the upper portions of the vertical side walls 18A and 18B. Upper support linear slide bearings 25 are comprised of durable load-bearing grade plastic material and each include an angled leading edge for the purpose of deflecting any foreign materials or debris from entering the longitudinal and substantially parallel horizontal channel or internal tracks 19A and 19B, such as when the live-bulkhead assembly 6 is moving in a rearward direction. The tracks permit the live-bulkhead assembly 6 to be moved together with the live-bed flexible member 5 generally along the full distance of the length of the trailer bed support surface 14. These major components work together to facilitate various loading and unloading operations associated with the live-bed utility trailer invention.

As shown in FIG. 3, an underside view of the advanced live-bed trailer 1 illustrates the twin axle assemblies 4, suspension, and wheel and tire assemblies 3. Both of the axle assemblies are commercially available and further include complete wheel hubs and bearings, spindles, braking system components, and built-in suspension mechanisms. In particular, the suspension is comprised of trialing links mounted within rubber isolators that further serve as independent torsional suspension springs. As illustrated, there are four suspension trailing links disposed between the main structural beam of the axles 20A and 20B and the respective wheel hub and brake assemblies. Each of the axle main structural beams 20A and 20B is directly and securely fastened to the main structural frame of the trailer at designated attachment mounting plates with threaded fasteners.

Although they may be provided in alternative embodiments, traditional shock absorbers are not required at each wheel suspension unit since the torsional rubber springs inherently provide a reasonable degree of damping of each wheel over rough roads and surfaces. As shown, four sixteen-inch diameter wheels are securely held to their respective wheel hubs by eight wheel studs and lug nuts. These wheels further include sixteen-inch pneumatic tubeless tires selected for the maximum suitable load capacity of the trailer and include a tire tread design suitable for both on-highway and rough terrain off-road use.

As shown in FIGS. 1, 2, 3 and 4, a pair of steel wheel fenders 21A and 21B are secured to each side of the main structural frame of the trailer. These may be required for proper use on the highway and serve the useful and essential function of helping to protect against water splashes, mud, and debris from the tires during transport.

As shown in FIGS. 1, 2, and 3, the rear-most portion of the trailer may be provided with a pair of rear tailgate swinging doors 22A and 22B, each of which are supported by vertical hinges or pins at their respective attachment brackets at their respective rear-most ends of the structural vertical side walls 18A and 18B of the trailer main frame 2. The left side swinging door 22B further includes an overlapping structural member that can be pinned or otherwise quickly secured and locked to the right side swinging door 22A. These doors help permit securing of materials and equipment within the trailer during towing or transport. When loading or unloading the trailer, the rear tailgate doors 22A and 22B can be selectively swung fully open, secured partially open at desired angles, or otherwise completely removed to facilitate ease of loading or unloading operations.

Optionally, each of the rear tailgate swinging doors 22A and 22B may be selectively secured in partially closed positions or otherwise configured with one side open and the opposite side closed, or at selective angles for example. These various secured positions can be highly useful when the live-bed flexible member 5 and live-bulkhead assembly 6 are engaged for the off-loading of loose materials, such as sand, top soil, gravel or other like or loose and partially flow able materials. This method and aspect of trailer unloading provides the ability to control the rate and distribution pattern of material from the rear-most end of the trailer when for example the trailer is also being slowly moved in a direction of travel while the live-bed flexible member is activated in a rearward off-loading direction. Additionally, this invention may provide other optional types of specific purpose-designed optional attachments for the rearward portion of the trailer, such that a number of automated material spreading and distribution applications can be provided.

Further, a number of convenient trailer side wall stake pockets 23 may be provided at the outer and inner left and right side walls of the trailer. These side pockets can readily accept and secure typical 2"×4" vertical wooden or metal stakes. The vertical stakes can then serve as a structural basis for temporarily increasing the effective side wall heights the with optional add-on side walls that will allow the containment of additional stacked or lightweight voluminous materials to be loaded onto the trailer. Additionally, a number of recessed or exposed steel loop tie-down points 23A may be strategically located at the interior front and rear corners within the bed walls. These provide ready and secure locations for load straps and or chains to be secured, as may be desired.

As shown in FIGS. 1, 2, 3, 4 and 4A, a commercially available roll-up protective load cover 24 may be mounted at the forward end of the trailer main frame 2. A hand crank allows rapid deployment and retraction of the protective load cover as needed to cover loose materials carried within the bed area of the trailer. In some situations, such a load cover may be a safety requirement on public roads and highways.

Figure 5:
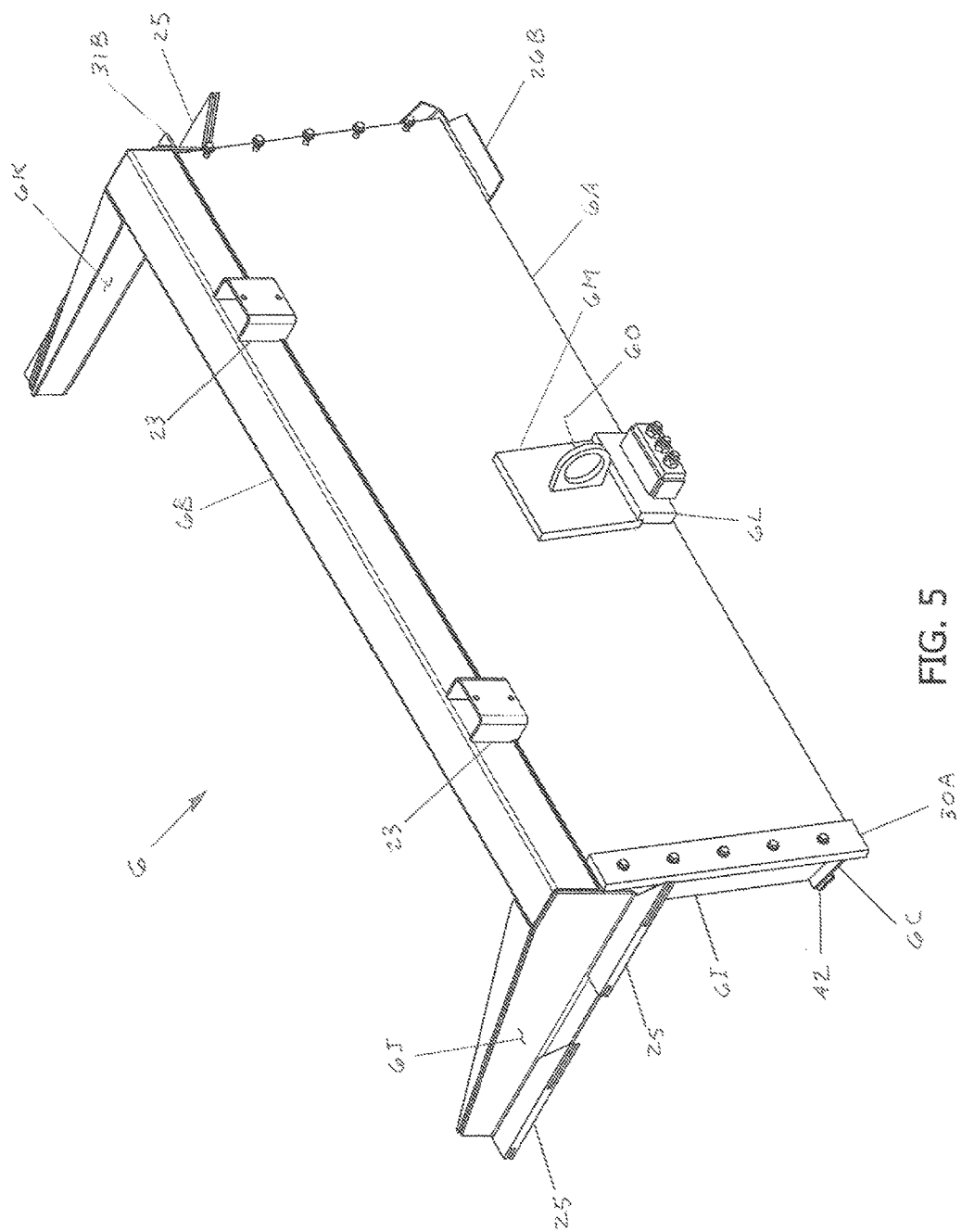
FIG. 5 is a three-quarter left-rear upper perspective view of the live-bulkhead assembly.

FIGS. 5 and 5A-5P show the live-bulkhead assembly 6, which is designed for movable sliding action forward and rearward over the bed support surface 14 and within the structural vertical side walls 18A and 18B of the live-bed utility trailer 1. The main body of the live-bulkhead assembly 6 is generally comprised of welded structural steel, various steel plates, and additional items of various materials and means of attachment. As illustrated, the welded structural steel portion of the live-bulkhead assembly 6 is comprised of main plate 6A which is welded to cross support 6B along the upper portion of the main plate 6A. Main plate 6A is further strengthened by bottom structural plate 6C and 6C' along with vertical supports 6D, 6E, 6F, 6G, 6H, 6I. Upper slide bearing supports 6J, 6K may also be welded or gusseted to the main part of the live-bulkhead assembly 6. The illustrated live-bulkhead assembly 6 includes four live-bulkhead upper support linear slide bearings 25 that are secured to the upper slide bearing supports 6J, 6K. The slide bearings 25 provide low friction engagement at the horizontal channels or internal tracks 19A and 19B within the structural vertical side walls 18A and 18B of the trailer main frame 2.

Live-bulkhead upper support linear slide angle guides 31B and 31A may also be included to provide additional sliding axis constraint to the live-bulkhead assembly 6 as these guides serve to engage the upper portions of the structural vertical side walls 18A and 18B, respectively. Further, bed corner scraper guide plates 26A and 26B may be secured to the live bulkhead bottom structural portion 6P at the outer ends of live-bulkhead bottom structural plate 6C and 6C', respectively.

As shown in FIG. 5, live-bulkhead side wall wiper seals 30A and 30B are secured to the live-bulkhead assembly 6 at live-bulkhead main plate 6A by a series to threaded fasteners at each end of bulkhead assembly 6. The live-bulkhead side wall wiper seals 30A and 30B may be optionally comprised of load bearing grade plastic, rubber belting, or similar flexible long-wearing and durable materials. The two side wall wiper seals 30A and 30B provide an improved self-sealing effect between the respective ends of the live-bulkhead assembly 6 and the stationary structural vertical side walls 18A and 18B, such as to prevent the passage of loose materials and debris, for example when sand or gravel are transported. Trailer side wall stake pockets 23 similar to those used at the structural vertical side walls, 18A and 18B of the trailer main frame 2 may further be included at the cross support 6B of the live bulkhead assembly 6.

The center load plate 6L and live bulkhead load pull ring support plate 6M provide additional strength and stress reduction at the center area of the live bulkhead assembly 6 where the bulkhead load pull ring 6O and the live-bed flexible member 5 drive chains connect to the live-bulkhead assembly 6.

As best shown in FIGS. 5J, 5L, 5N, 5O, and 5P, the live-bulkhead bottom structural portion 6P of the live-bulkhead assembly 6 provides load-bearing attachment points for three partially-independent closed-link load chains 35A, 35B, and 35C (shown in FIGS. 3 and 3B). The closed-link load chains 35A, 35B, and 35C extend forward toward the front portion of the trailer (not shown). The three closed-link load chains 35A, 35B, and 35C are attached to the live-bulkhead assembly 6 at their respective drive chain clevis couplings 33A, 33B, and 33C by drive chain clevis pins 34A, 34B, and 34C, which then extend through holes provided within the live bulkhead center load plate 6L. The threaded ends of the drive chain clevis couplings 33A, 33B, and 33C then respectively extend through a set of three live-bulkhead drive chain urethane load springs 32A, 32B, 32C.

Each of the live-bulkhead drive chain urethane load springs 32A, 32B, 32C are cylindrical in shape having a central hole concentric with its axis to allow the drive chain couplings 33A, 33B, and 33C to freely extend through. The use of urethane as a load spring is advantageous in that unlike typical steel coil springs, the urethane spring material is not subject to eventual corrosion or potential metal fatigue failure. The drive extended threaded portions of the chain couplings 33A, 33B, and 33C are secured in place by a respective self-locking clevis treaded nut 37A, 37B, 37C where each nut can be selectively and individually tightened to adjust the working tension of the partially-independent closed-link load chains 35A, 35B, and 35C (shown in FIGS. 3 and 3B).

A further aspect of drive chain load block 36 is that the drive chain load block side plates 36A, 36A' and drive chain load block top plate 36B are of selected shorter longitudinal horizontal dimension than that of the installed or preload length of the live-bulkhead drive chain urethane load springs 32A, 32B, 32C. This provides a dimensional clearance gap 38 (shown in FIG. 5G) between the forward faces of the drive chain load block top plate 36B and the rearward face of the live bulkhead center load plate 6L. As excessive tension load may be applied by the closed-link load chains 35A, 35B, and 35C (shown in FIGS. 3 and 3B) at the live-bulkhead drive chain urethane load springs 32A, 32B, 32C under certain foreseeable and temporarily excessive load conditions caused by load reactions experienced at the live-bulkhead assembly 6 and live-bed flexible member 5, the dimensional gap 38 will approach zero. As this occurs the forward face of the drive chain load block 36 effectively makes contact with the rearward face of the live bulkhead center load plate 6L. This feature provides and serves as a hard mechanical stop to prevent excess compression of and potentially damaging permanent deformation of the live-bulkhead drive chain urethane load springs 32A, 32B, 32C until the excessively high and temporary load condition has passed. An additional benefit of this feature is that the urethane load springs 32A, 32B, 32C are reasonably well protected from direct impact damage from materials and debris. As the drive chain load block 36, side plates 36A, 36A', and top plate 36B, which are welded together as a single assembly, provides an overall shielding effect to the urethane load springs 32A, 32B, 32C.

Shown in FIGS. 6, 6A and 6B, the live-bed flexible member 5 of the live-bed (or live-bottom) utility trailer 1 is generally comprised of a wide one-piece section of industrial grade conveyor flexible rubber belting. This commercially available material is well known within the manufacturing industry and most particularly within the rock, mineral and mining process industries for example. The live-bed flexible member 5 is laid out flat and generally horizontally resting upon and supported by the primary support surface or bed support surface 14 of the trailer main frame 2. The live-bed flexible member 5 extends laterally across the entire width and area of the bed support surface 14 of the trailer main frame 2 from a first structural vertical side wall 18A to a second or opposite structural vertical side wall 18B at the opposite side of the trailer main frame 2. Dimensional side clearance may be, however, be provided by design between the longitudinal edges 5A and 5A' of the live bed flexible member 5 and the respective structural vertical side walls, 18A and 18B to avoid unwanted friction and thereby allow free longitudinal movement both forward and rearward of the live-bed flexible member 5 between the respective vertical structural support side walls 18A and 18B.

The forward-most ends 5A and 5A' of the live-bed flexible member 5 is secured and otherwise fastened to the bottom structural portion 6P of the live-bulkhead assembly 6 by a series of fasteners as generally shown in FIGS. 5H-5P. The fasteners are preferably threaded hex head cap screws 39, further including corresponding optional flat washers 40 and self-locking hex nuts 41 for threaded engagement with the hex head cap screws 39.

The hex head cap screws 39 engage a corresponding series of through-holes within the forward-most ends 5A and 5A' of the live-bed flexible member 5, and further engage a second set or series of through-holes within a pair of forward end flexible member clamp strips 42 and 42'. Finally, the hex head cap screws 39 engage a corresponding third set or series of through-holes at and through the live-bulkhead bottom structural plates 6C and 6C' of the live-bulkhead assembly 6. This arrangement provides a secure mechanical connection or clamp anchoring of the upper and forward-most ends 5A and 5A' of the live bed flexible member 5 between the bottom face structural portion 6P of the live-bulkhead assembly 6 and the forward-end flexible member clamp strips 42 and 42'.

Additionally included and secured at each end outer ends of the flexible member clamping strips 42 and 42' and the live-bulkhead assembly 6 are a respective pair of bed corner scraper guide plates 26B and 26A. These bed corner scraper guide plates 26B and 26A help to serve as a sliding frictional contact guides for the live-bulkhead assembly 6 and the live bed flexible member 5 as it moves forward and back between the first and second structural vertical side walls 18A and 18B and along the longitudinal horizontal plates 17A, 17B, 17C, and 17D at bed support surface 14. Further, the bed corner scraper guide plates 26B and 26A provide both a scraping and sealing function to help prevent and reduce foreign materials and debris within the trailer bed from getting into gap areas between the live bed flexible member 5 and the trailer main frame 2. The longitudinal horizontal plates 17A, 17B, 17C, and 17D at the bed support surface 14 and along the first and second structural vertical side walls 18A and 18B and along the bed support surface 14, help provide a smooth running support and reasonably effective sealing surface for the bed corner scraper guide plates 26B and 26A as relative motion of the live bed flexible member 5 takes place.

The rearward-most end 5B of the live-bed flexible member 5 is directed over, downward, and around a cylindrical rolling member or preferably a set of cylindrical rolling members 43A, 43B, and 43C, as shown in FIGS. 7, 7A, and 7B. These are mounted laterally for free rotation at the rearward-most end 2B of the trailer main frame 2. The cylindrical rolling members 43A, 43B, and 43C are preferably comprised of aluminum tubing in three individual cylindrical sections extending in approximately one third dimensional length segments approximately across the full dimensional width of the rearward-most end 2B of the trailer main frame 2. Each of the cylindrical rolling members 43A, 43B, and 43C are rotatably supported at their respective ends. Preferably the cylindrical rollers 43A, 43B, and 43C are supported by permanently lubricated and sealed roller or ball bearings 44, each concentrically installed and engaged for rotation between the respective ends of each of the cylindrical rollers 43A, 43B, and 43C by a single-piece square-tube support shaft 45. The inner portions or inner bearing races of each of the sealed ball bearings 44 are comprised of geometry provided by square through-holes 44A. The square through-holes 44A of each of the sealed ball bearings 44 are of such dimension that the square support shaft 45 may be freely and slidably engaged to fit through each of the inner square through holes 44A of the sealed ball bearings 44. The single-piece square support shaft 45 is preferably comprised of square structural steel tubing in cross section for good strength and reduced weight; however, it may optionally comprised of alternate materials or otherwise solid in cross section as necessary to meet design and strength requirements.

The square-tube support shaft 45 slidably fits into a series of close-fitting generally horizontal open-end slots 46A provided at four vertical square shaft mounting plates 46 located and secured by welds along the rear-most end 2B of trailer main frame 2. In the illustrated embodiment, a series of six sealed ball bearings 44 having corresponding square through-holes 44A within the inner race of the sealed ball bearings 44 freely slip onto the square-tube support shaft 45 to support of each the three individual cylindrical rolling members 43A, 43B, and 43C. This arrangement allows the live-bed flexible member 5 to freely and mechanically wrap approximately 180 degrees around the three individual cylindrical rolling members 43A, 43B, and 43C at the rear-most end of trailer main frame 2B. This arrangement enables the live-bed flexible member 5 to be substantially fully supported for free rotation and wrap around the rear-most end of trailer main frame 2B with relatively low friction. This is somewhat comparable to the kinematics of a rope placed around a pulley wheel while placed under tension, where the rope can be alternately and freely pulled back and forth over the pulley wheel in opposite directions.

Both the tension and operating alignment of the live-bed flexible member 5 may be adjusted with a set of four tension and alignment adjustment screws 47. Each of the four tension and alignment adjustment screws 47 are comprised of threaded fasteners engaged into respective threaded through-holes 46B at and within each square shaft mounting plate 46. The outer-most ends of the tension and alignment adjustment screws 47 contact and engage the respective forward face of the square-tube support shaft 45. This provides four points of horizontally adjustable contact and support at the square-tube support shaft 45. This mechanical arrangement provides a method of tension adjustment for both the live-bed flexible member 5 and the closed-link load chains 35A, 35B, and 35C (shown in FIGS. 3 and 3B). Additionally this arrangement provides a method of adjusting the side-to-side or lateral operating alignment of the live-bed flexible member 5 as it passes over and tracks around the cylindrical rolling members 43A, 43B, and 43C at the rear-most end 2B of the trailer main frame 2.

As shown in FIGS. 7 and 7A, three cylindrical roller wiper brackets 48A, 48B, and 48C are designed to include and maintain an elongated scraping edge at close proximity to the outer contact surfaces of their respective cylindrical rolling members 43A, 43B, and 43C for the purpose of scraping-off any debris or material that may tend to stick to the outer surfaces of the cylindrical rolling members 43A, 43B, and 43C. This feature can be helpful in reducing the accumulation of any foreign materials between the cylindrical rolling members 43A, 43B, and 43C and the live-bed flexible member 5.

The rearward-most end 5B of the live-bed flexible member 5 is directed rearward, downward, 180 degrees around and then forward below the cylindrical rolling members 43A, 43B, and 43C where it is then attached to and between a pair of steel rearward end underside flexible member clamp strips 49, 49', as shown in FIGS. 3 and 3B. The rearward end underside flexible member clamp strips 49, 49' remain at the underside of the trailer main frame 2 at all times. Similar to the forward-end flexible member clamp strips 42, 42', the rearward-end underside flexible member clamp strips 49, 49' secure and clamps to the live-bed flexible member rearward-most end 5B by a series of fasteners As at the forward end, the fasteners are preferably threaded hex head cap screws 39', further including corresponding optional flat washers 40' and self-locking hex nuts 41' for threaded engagement with the hex head cap screws 39'.

The underside live-bed flexible member 5 clamping arrangement provides a secure mechanical connection for the live-bed flexible member rearward most end 5B of the live-bed flexible member 5, as it becomes firmly secured between the respective rearward-end underside flexible member clamp strips 49, 49'. Additionally, this arrangement further provides secure attachment points for the three partially-independent closed-link load chains 35A, 35B, and 35C (shown in FIGS. 3 and 3B), while the opposite respective ends of the closed-link load chains 35A, 35B, and 35C are attached to the live-bulkhead bottom structural plates 6C, 6C' at the lower forward portion of the live-bulkhead assembly 6. Accordingly, the closed-link load chains 35A, 35B, and 35C are wrapped around approximately 180 degrees of engagement with and driven by a set of three unique and specially-designed closed-loop load chain drive sprockets 51A, 51B, and 51C for powered operation of the live-bed flexible member 5 and live-bulkhead assembly 6.

The live-bed flexible member drive system of the current invention represents a simple, robust, reliable and functional design. As previously described, the set of three independent closed-loop-link load chains are essentially commercially available load chains selected by size and of sufficient capacity to advance and retract the live-bed flexible member and live-bulkhead assembly under heavy loads in all common environmental conditions and road-going circumstances. The advantage of the closed-loop-link load chains is that, unlike typical roller chains or leaf-link chains, long-term exposure to the elements and various foreign materials has little detrimental effect to rust or corrosion. The closed-loop-link load chains utilized by the current invention permit the live-bed trailer to remain completely functional in all conditions over an extended period of time. This remains true if the trailer should remain in constant use or otherwise remain inactive for long periods of non-use. The use of closed-loop-link load chains over that of typical cable and pulley systems is that the chains are much less likely to rapidly wear from lack of lubrication and maintenance, fatigue, or wear out and require replacement over extended periods of use, misuse, or common maintenance neglect.

As shown in FIGS. 3, 3A, 4, 4A, 4B, and 8, the live-bed flexible member mechanical drive system 50, when in operation, is able to drive and actuate the live-bed flexible member 5 and the live-bulkhead assembly 6 in a forward or rearward direction generally over and upon the bed support surface 14 of the advanced live-bed utility trailer 1 for the useful and efficient purposes of self-loading, transport, and self-unloading of materials and/or equipment as desired, without the traditional requirement for or assistance from additional loading or unloading powered equipment. This aspect alone represents a substantial savings in time, cost, and effort to business owners, contractors, and others who rely on the use of utility trailers to accomplish a wide variety of transport tasks.

Figure 4B:
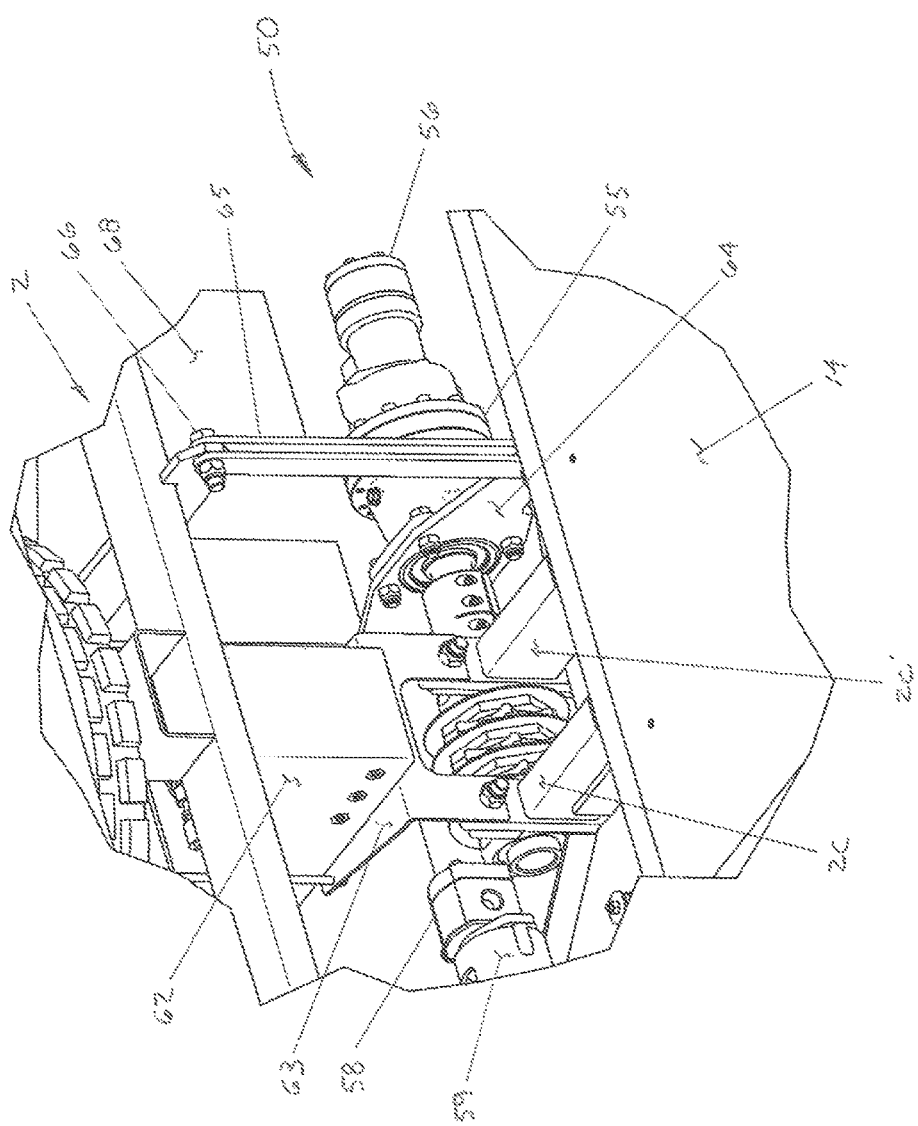
FIG. 4B is a further detailed view of the live-bed flexible member mechanical drive system shown at the forward portion of the main frame of detail view FIG. 4A.
Figure 8:
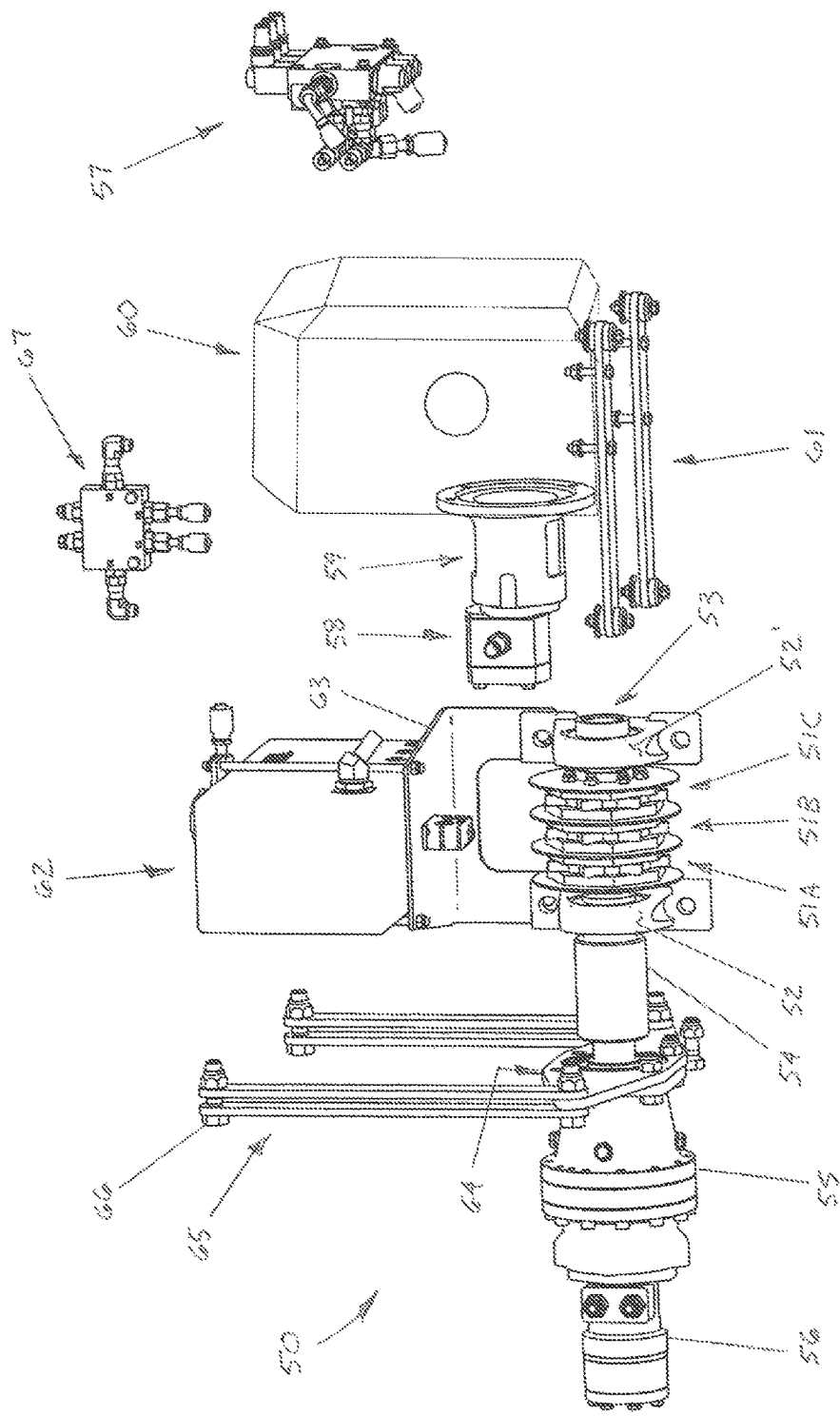
FIG. 8 is a frontal perspective view representation of the primary components of the live-bed flexible member mechanical drive system.

In its current and preferred embodiment, as shown in FIGS. 4B and 8, a beneficial aspect of the advanced utility trailer live-bed flexible member drive system lies with the simplicity of its design combined with a high level of robustness for its anticipated exposure to harsh operating environments including mud, road salt, ice and snow and heavy working-load conditions. Additionally because of the simplicity of the overall design this further lends itself to reasonably low manufacturing costs and minimal on-going maintenance costs while in actual service compared to the positive benefits provided.

More specifically, the live-bed flexible member drive system 50 is comprised of a set of three partially independent closed-link load chains 35A, 35B, and 35C (shown in FIGS. 3 and 3B) which are used to move and transmit mechanical power including forward and rearward motion to the live-bed flexible member 5 and the live-bulkhead assembly 6. The closed-link load chains 35A, 35B, and 35C are fastened at their respective opposite ends with the first ends attached to the live-bulkhead assembly 6 and the second ends attached to the second end of the live-bed flexible member rearward most end 5B. The second end or forward-most ends 5A, 5A' of the live-bed flexible member is then again attached back to the live-bulkhead assembly 6. This creates a continuous mechanical loop that is then driven by the live-bed flexible member drive system 50 at load chain drive sprockets 51A, 51B, and 51C.

FIGS. 4B and 8 clearly show several components of the live-bed flexible member mechanical drive system 50, including load chain drive sprockets 51A, 51B, and 51C mounted to the drive sprocket main shaft 53, which is supported by chain drive bearing mounts 2C, 2C' at trailer main frame 2 at the drive sprocket bearings 52, 52'. Drive shaft main coupling 54 connects the planetary reduction gearbox 55 to the drive sprocket main shaft 53 for positive rotational drive by square key drive 53A. A similar drive key connection is made between drive shaft main coupling 54 and the output shaft of planetary reduction gearbox 55 at square key drive 54A. A hydraulic drive motor 56 is attached to the drive planetary reduction gearbox 55 at its input shaft.

The flow of hydraulic oil under pressure from hydraulic pump 58 is controlled by hydraulic control valve assembly 57 to hydraulic drive motor 56. Manual control by the operator at control valve assembly 57 allows the operator to selectively actuate the live-bed flexible member mechanical drive system 50. The hydraulic pump 58 is driven by an engine package 60 through a hydraulic pump drive adapter 59. The engine package 60 is mounted to the trailer main frame 2 at engine mounting platform 2D via engine mounts with isolators 61. A hydraulic reservoir 62 is secured at a hydraulic reservoir support 63 to provide a supply of hydraulic oil to the hydraulic system. A hydraulic drive motor mounting plate 64 and mechanical drive vertical support members 65, including mechanical drive vertical support member fasteners 66, support the hydraulic pump 58, planetary reduction gearbox 55, and drive shaft main coupling 54 at the trailer main frame 2. A hydraulic lock valve 67, as shown in FIG. 8, may be mounted to the central portion of the upper front cross member 2A of the trailer main frame 2. The function of this valve is to hydraulically lock or prevent movement of the hydraulic cylinder 8 and drawbar assembly 7 when not being operated by the hydraulic control valve assembly 57. Various hydraulic lines, hoses, and connected fittings have been omitted from all figures for the purposes of more clearly showing other components within the illustrations.

The mechanical drive vertical support members 65, including the mechanical drive vertical support member fasteners 66, further provide a slightly flexible and forgiving mounting arrangement by virtue of the generally parallel vertical support members 65 attachment to the supported components. This helps to allow for any minor misalignments that may occur due to tolerance variation between the various rotating components. The arrangement reduces the possibility of any unnecessary stress within these components and drive shafts during operation.

A flexible guard 68 may be attached to trailer main frame 2 to provide a degree of splash and rock deflection protection to the various components of the live-bed flexible member mechanical drive system 50 as the trailer is being towed behind vehicles. A spare tire 69 for the advanced live-bed utility trailer 1 may also be mounted at the forward end of the trailer main frame 2. This location is selected as a matter of convenience as well as a matter of providing some further protection to the various components of the live-bed flexible member mechanical drive system 50. Optionally, a second protective cover or panel may be added to more completely cover and protect this area and the mechanical drive system 50 from falling debris and materials.

Figure 9:
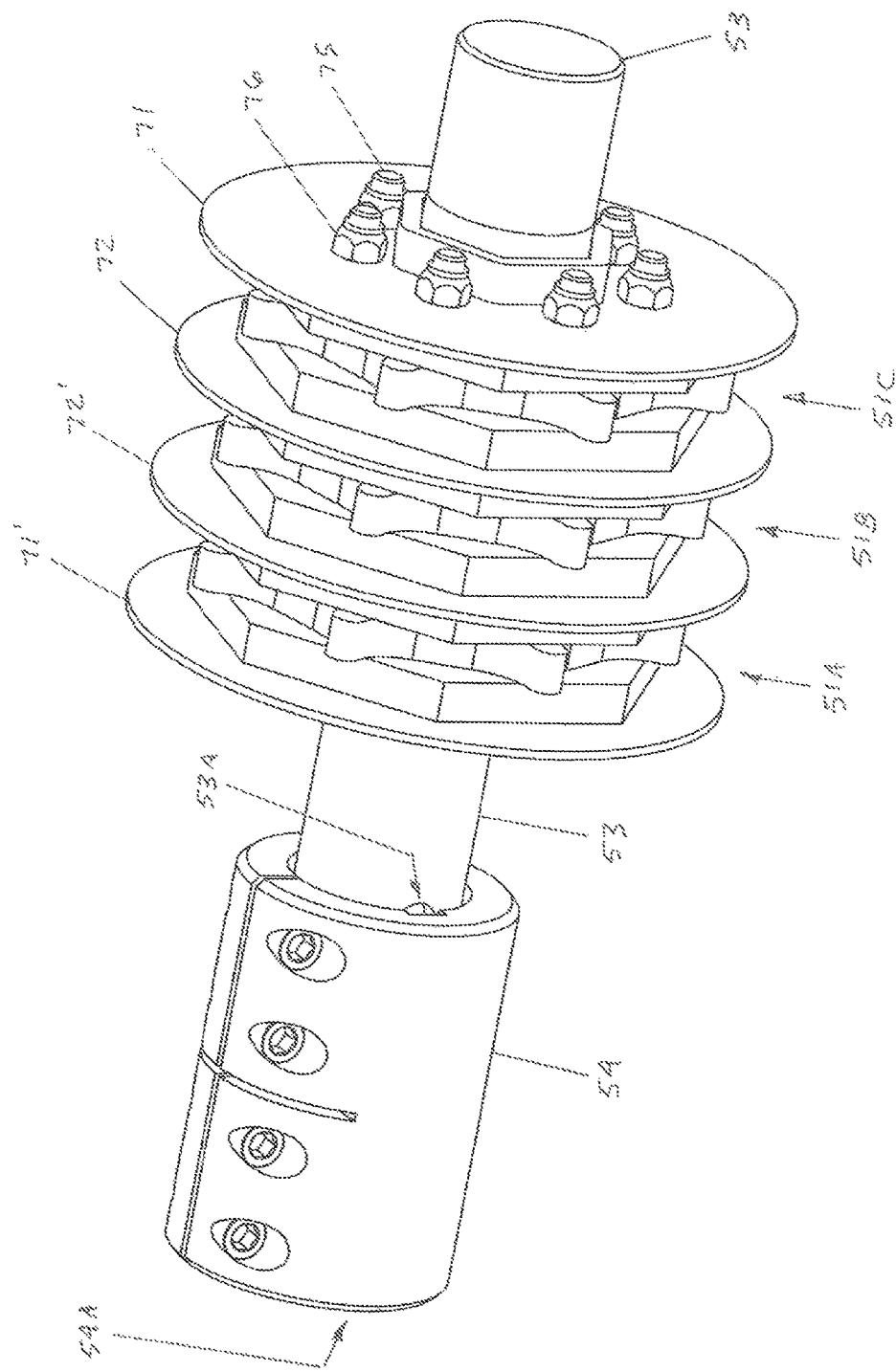
FIG. 9 is a frontal perspective view of the load chain drive sprockets, drive sprocket main shaft, and drive shaft main coupling also shown in FIG. 8.
Figure 14:
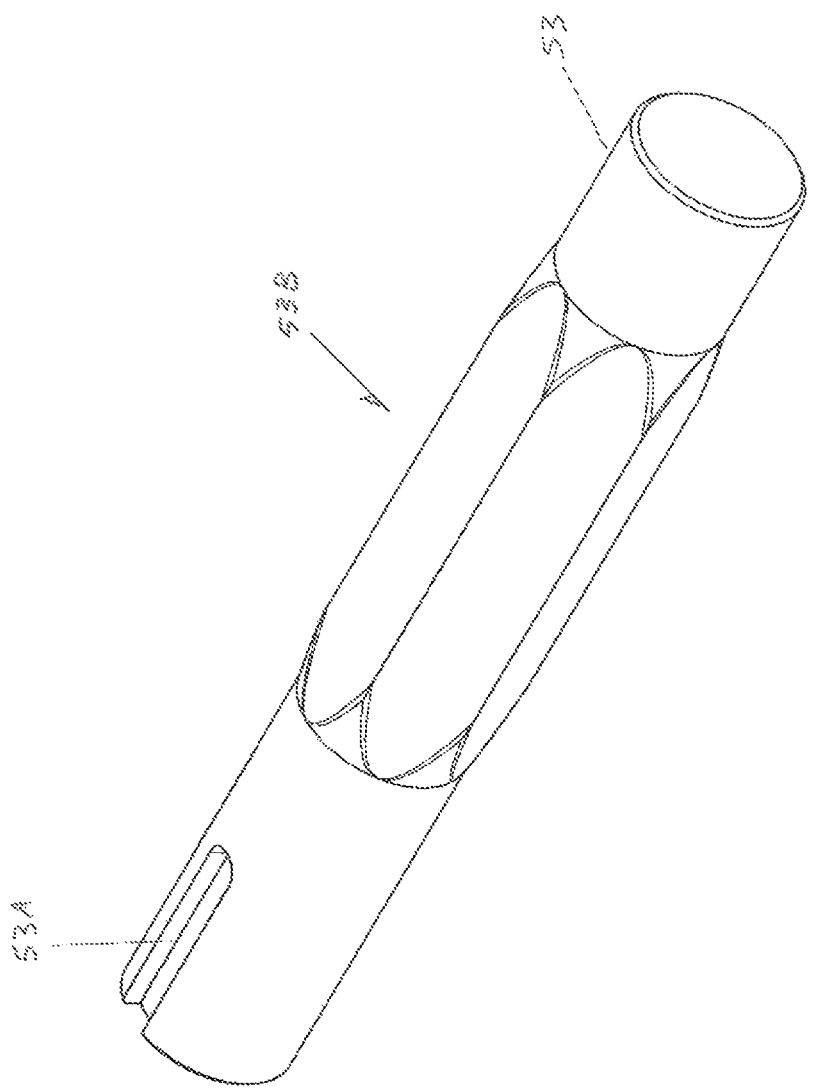
FIG. 14 is a detail perspective view of the drive sprocket shaft shown in FIG. 9.

FIG. 9 shows the load chain drive sprockets 51A, 51B, and 51C, drive sprocket main shaft 53, square drive key 53A, and drive shaft main coupling 54. Also, FIGS. 9A and 9B show the load chain drive sprockets 51A, 51B, and 51C, of FIG. 9 in a partially exploded or partially disassembled view to disclose greater detail. Chain drive sprocket outer side plates 71 and 71' and chain drive sprocket inner side plates 72 and 72' are engaged onto drive sprocket main shaft 53 for positive rotational drive at respective hexagonal engagement openings 77. Each of the respective hexagonal engagement openings 77 correspond to the hexagonal portion 53B of drive sprocket main shaft 53, as shown in FIG. 14. The dimensions of the hexagonal engagement openings 77 and the dimensions of hexagonal portion 53B of drive sprocket main shaft 53 are such that a simple slip-fit provides for ease of assembly between the similar components. The chain drive sprocket outer side plates 71 and 71' and chain drive sprocket inner side plates 72 and 72' act as sheave dividers or guides in order to maintain each of the closed-link load chains 35A, 35B, and 35C onto and within their respective load chain drive sprockets 51A, 51B, and 51C.

Each of the respective load chain drive sprockets 51A, 51B, and 51C are comprised of essentially the same components corresponding to chain drive sprocket segmented wheel 73, chain drive sprocket toothed wheel 74, and a second chain drive sprocket segmented wheel 73' as shown in FIG. 9B. Again, the dimensions of the hexagonal engagement openings 77 and the dimensions of hexagonal portion 53B of drive sprocket main shaft 53 are such that a simple slip-fit provides for ease of assembly between the similar mating components. The sub-assembly comprising load chain drive sprockets 51A, 51B, and 51C are assembled and securely clamped together by seven long threaded bolts or chain drive sprocket assembly clamp fasteners 75 and seven chain drive sprocket assembly clamp nuts 76.

Figure 10B:
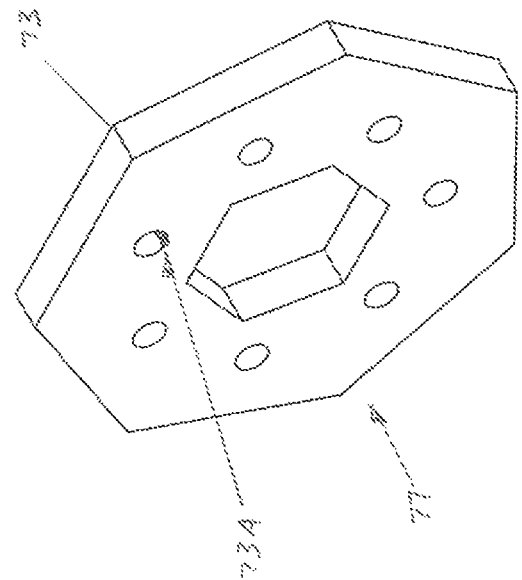
FIGS. 10, 10A, and 10B are detail views of the chain drive sprocket segmented wheel shown in FIG. 9B.
Figure 10A:
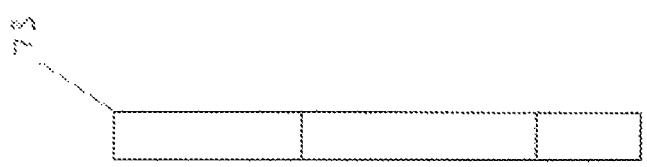
Figure 10:
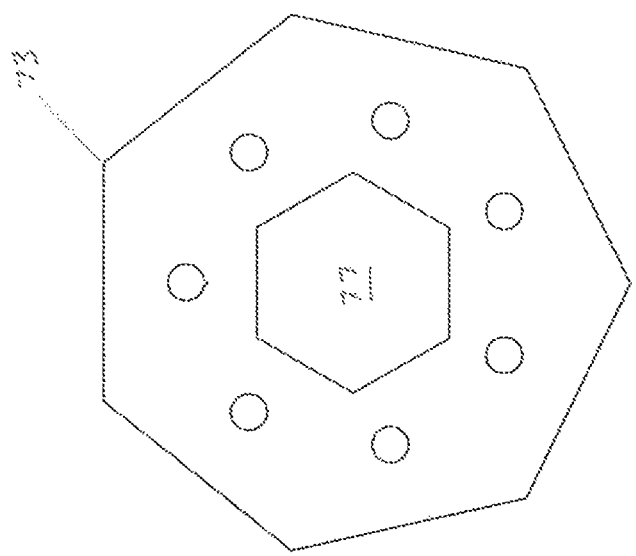
Figure 11B:
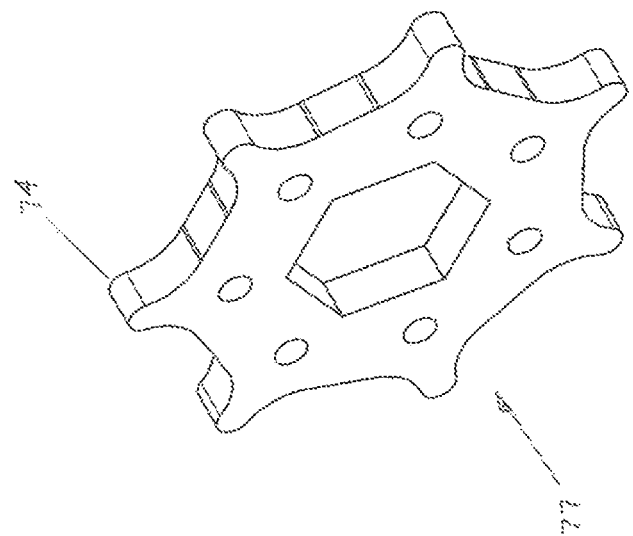
FIGS. 11, 11A, and 11B are detailed views of the chain drive sprocket toothed wheel shown in FIG. 9B.
Figure 11A:
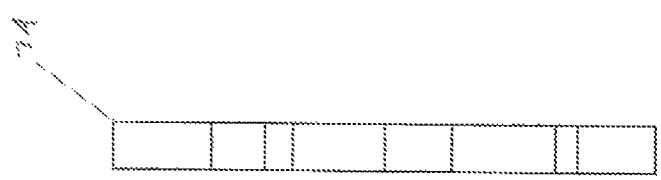
Figure 11:
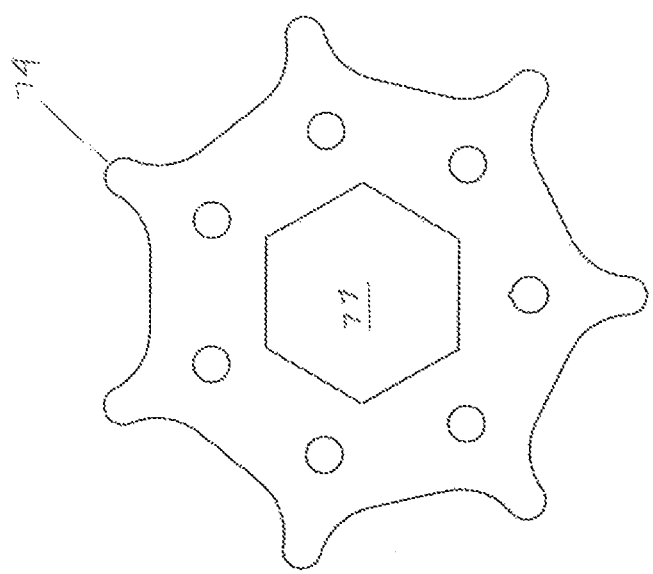

FIGS. 10, 10A, and 10B illustrate one example of chain drive sprocket segmented wheel 73. A small assembly alignment notch 73A is further provided during the manufacturing process to assist with ease of assembly and correctly index and align this component with respect to its mating components. FIGS. 11, 11A, and 11B illustrate an example of chain drive sprocket toothed wheel 74. FIG. 12 further illustrates the uniquely engineered geometry and relationships between the chain drive sprocket segmented wheel 73, the chain drive sprocket toothed wheel 74, and an example three-link portion of a-load chain representing the closed-link load chains 35A, 35B, and 35C.

Figure 13A:
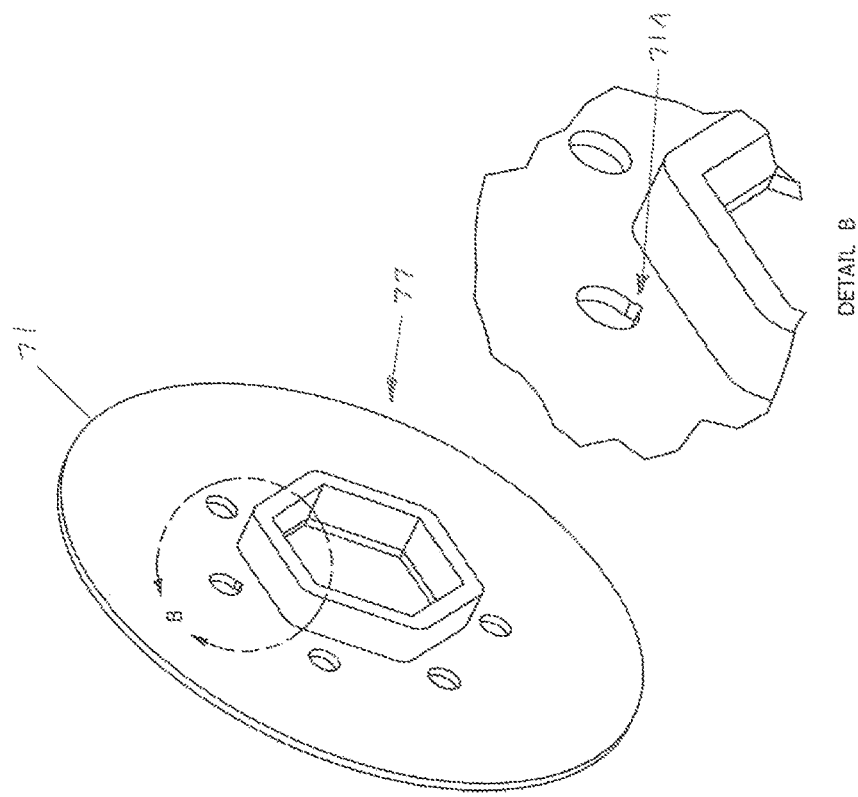
FIG. 13A is a detailed perspective view of the chain drive sprocket outer side plate shown in FIG. 9A and a further detailed view of the chain driver sprocket outer side plate taken at section B.
Figure 13:
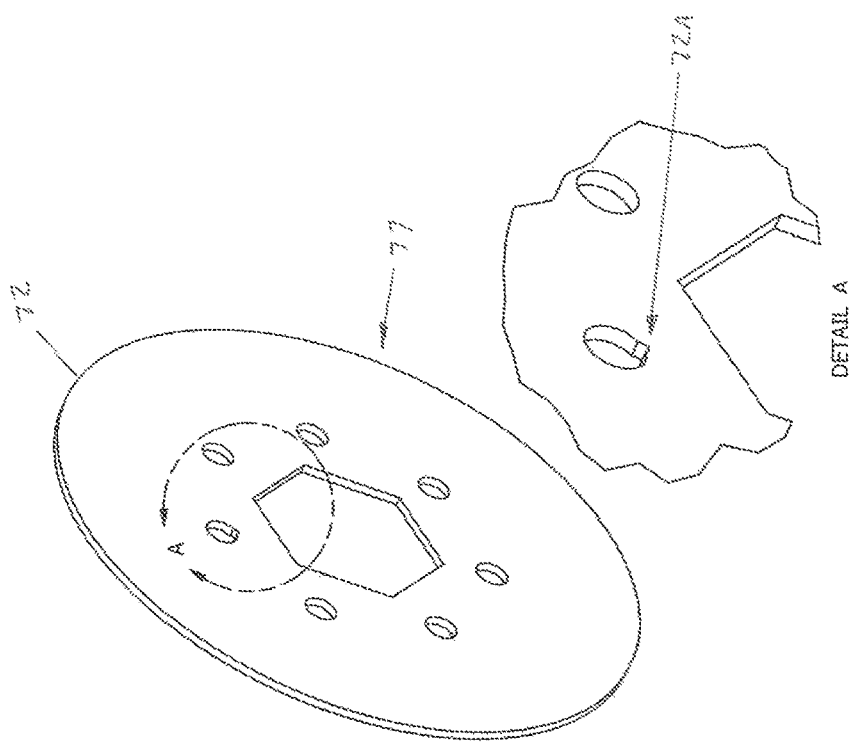
FIG. 13 is a detailed perspective view of the chain drive sprocket inner side plate shown in FIG. 9A and a further detailed view of the chain driver sprocket inner side plate taken at section A.

FIG. 13 illustrates an example of the chain drive sprocket inner side plate 72. A small assembly alignment notch 72A is further provided during the manufacturing process to assist with ease of assembly and correctly index and align this component with respect to its mating components. FIG. 13A illustrates an example the chain drive sprocket inner side plate 71. A small assembly alignment notch 71A is further provided during the manufacturing process to assist with ease of assembly and correctly index and align this component with respect to its mating components. A hexagonal hub 78 is welded concentrically at the hexagonal engagement opening at one side of the chain drive sprocket outer side plate 71. The hexagonal hub 78 acts as a spacer to correctly locate the drive sprocket assembly between the drive sprocket bearings 52 and 52' when the components are completely assembled.

Figure 17:
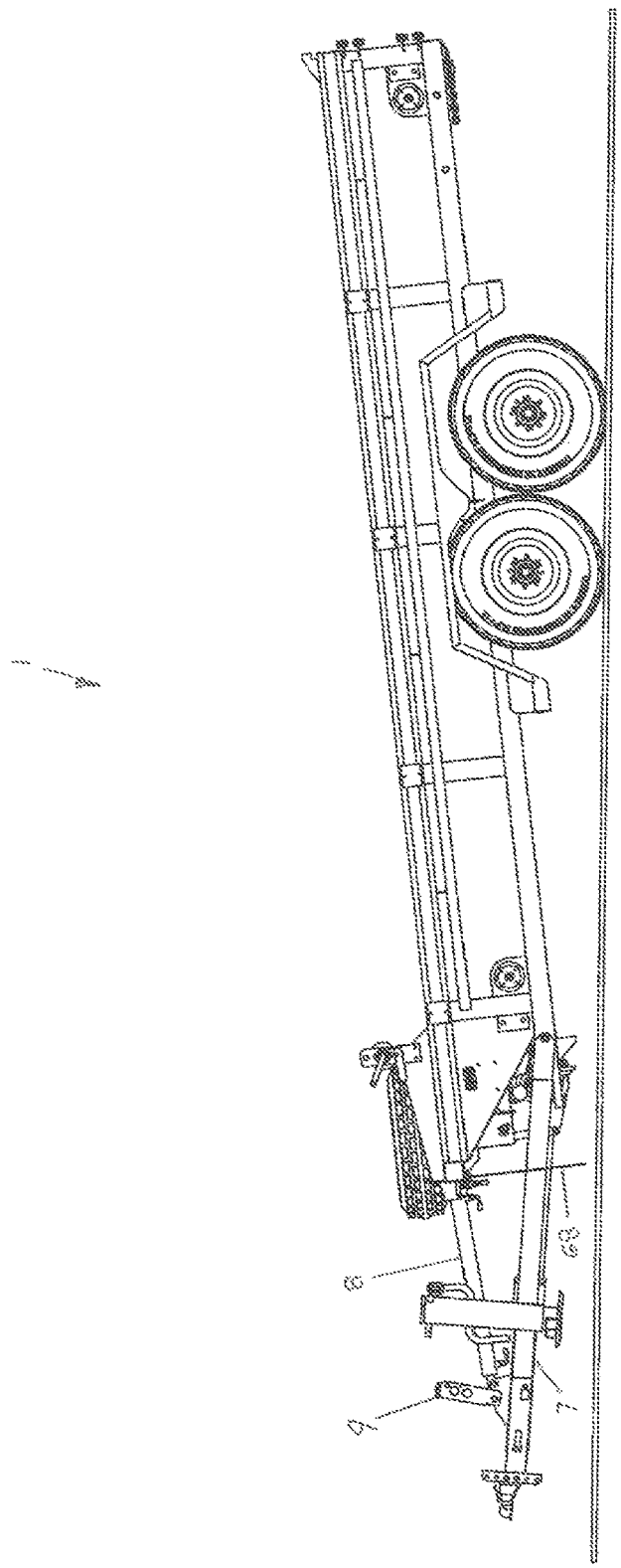
FIG. 17 is a left side elevational view of the live-bed utility trailer showing the drawbar hydraulic cylinder in fully retracted mode whereby the drawbar assembly has been fully raised with respect to the trailer main frame.

FIG. 17 shows the live-bed utility trailer 1 with the hydraulic cylinder 8 in a fully retracted mode, whereby the drawbar assembly 7 has been fully raised with respect to the trailer main frame 2. This mode of trailer operation serves to raise the rear-most end of trailer main frame 2B, providing an increased height advantage at the rear, such that loading and unloading operations at loading docks or other vehicles can be more easily accomplished.

Figure 18:
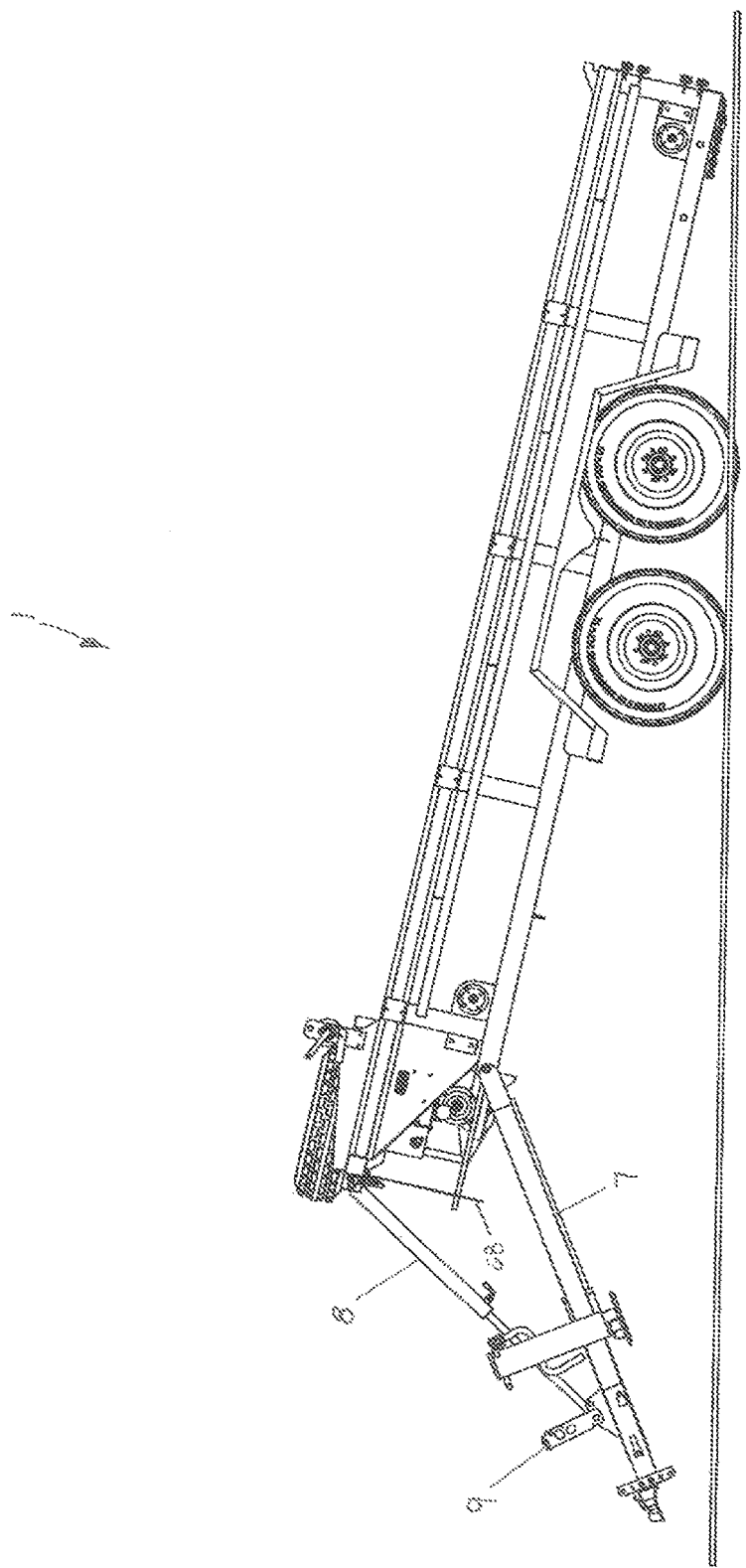
FIG. 18 is a left side elevational view of the live-bed utility trailer with the drawbar hydraulic cylinder in full extended mode whereby the drawbar assembly has been fully lowered with respect to the trailer main frame.

FIG. 18 shows the live-bed utility trailer 1 with the hydraulic cylinder 8 in a full extended mode, whereby the drawbar assembly 7 has been fully lowered with respect to the trailer main frame 2. This mode of trailer operation serves to lower the rear-most end of the trailer main frame 2B, providing a greatly reduced height advantage at the rear, such that loading and unloading operations can more readily take place at or near ground level.

Figure 19:
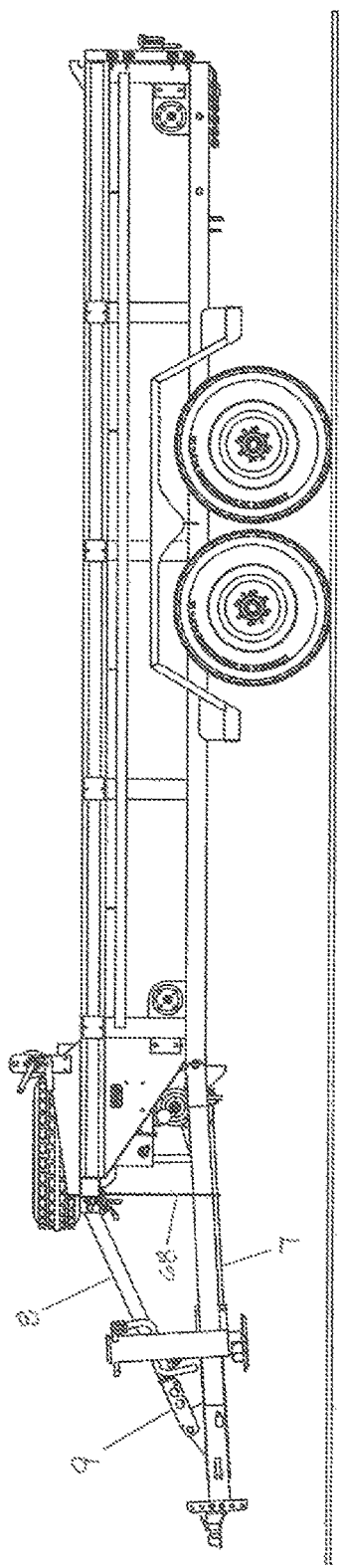
FIG. 19 is a left side elevational view of the live-bed utility trailer with the drawbar hydraulic cylinder at normal transport and towing position whereby the drawbar assembly has been secured in a fixed position by engagement of the drawbar cylinder stroke limiter.
Figure 20:
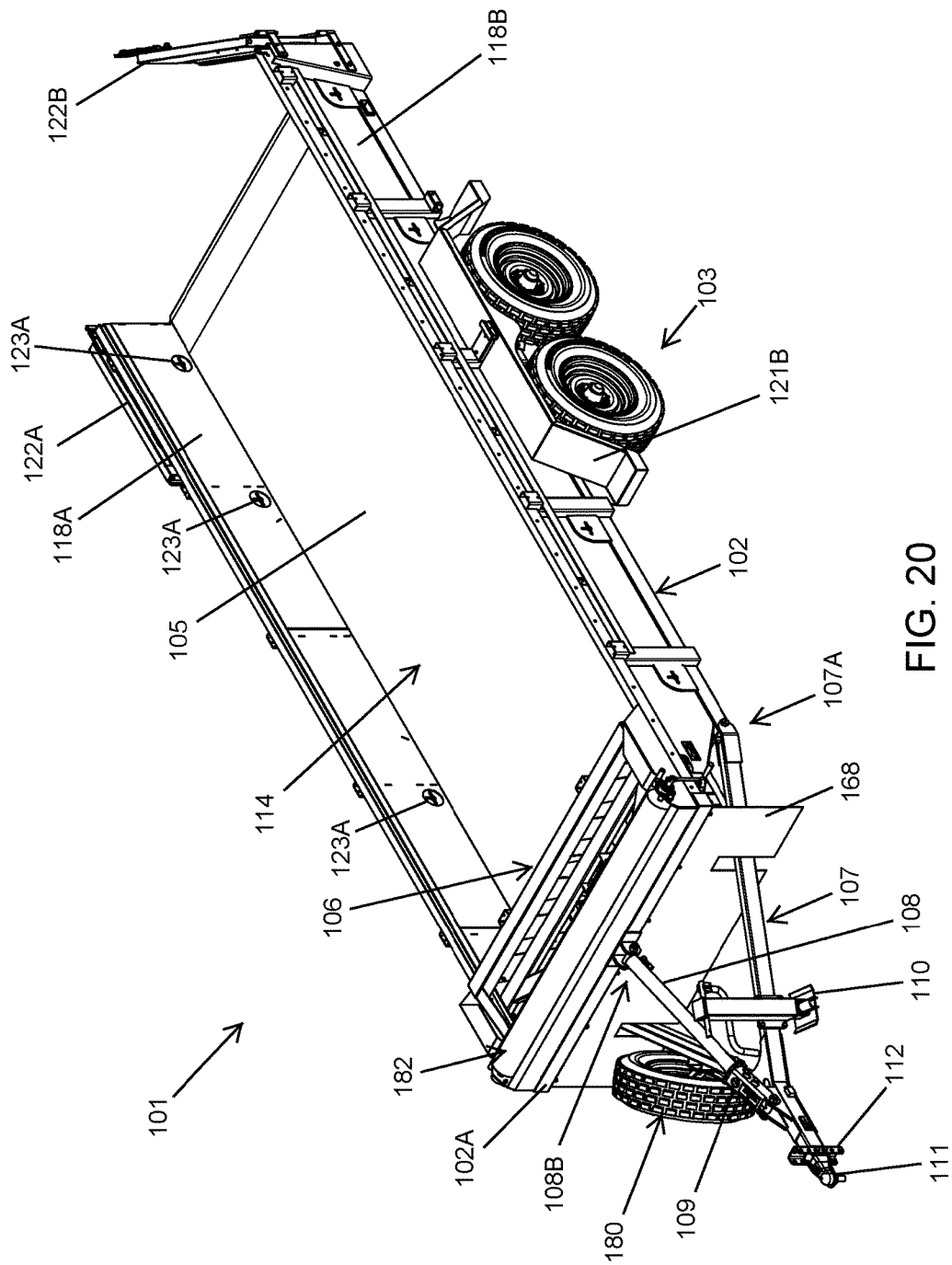
FIG. 20 is a three-quarter left-front upper perspective view of a live-bed utility trailer in accordance with an additional embodiment of the present invention.

FIG. 19 shows the live-bed utility trailer 1 with the hydraulic cylinder 8 at normal transport and towing position whereby the drawbar assembly 7 has been secured in a fixed position by engagement of the drawbar cylinder stroke limiter 9.

Referring now to FIGS. 20-28C, a live-bed utility trailer 101 includes a wider trailer bed support surface 114, along with some additional tie-down points 123A inside the trailer walls 118A. The bed of the trailer 101 has a width of about 80 inches, while the above-described embodiment of the trailer 1 has a bed with a width of about 76 inches. Also, the live-bed utility trailer 101 is illustrated with the right tailgate 122A swung out of the way in a forward position as an example of how the tailgate can be held open against the trailer walls 118A. It is further shown that the spare tire location 180 has moved to be attached at the drawbar assembly 107 to orient the tire generally vertically. The forward vertically oriented spare tire location 180 provides provide additional space for the trailer roll-up load cover 182 to positioned closer to the front of the trailer 101, over the front cross member 102A.

Figure 21:
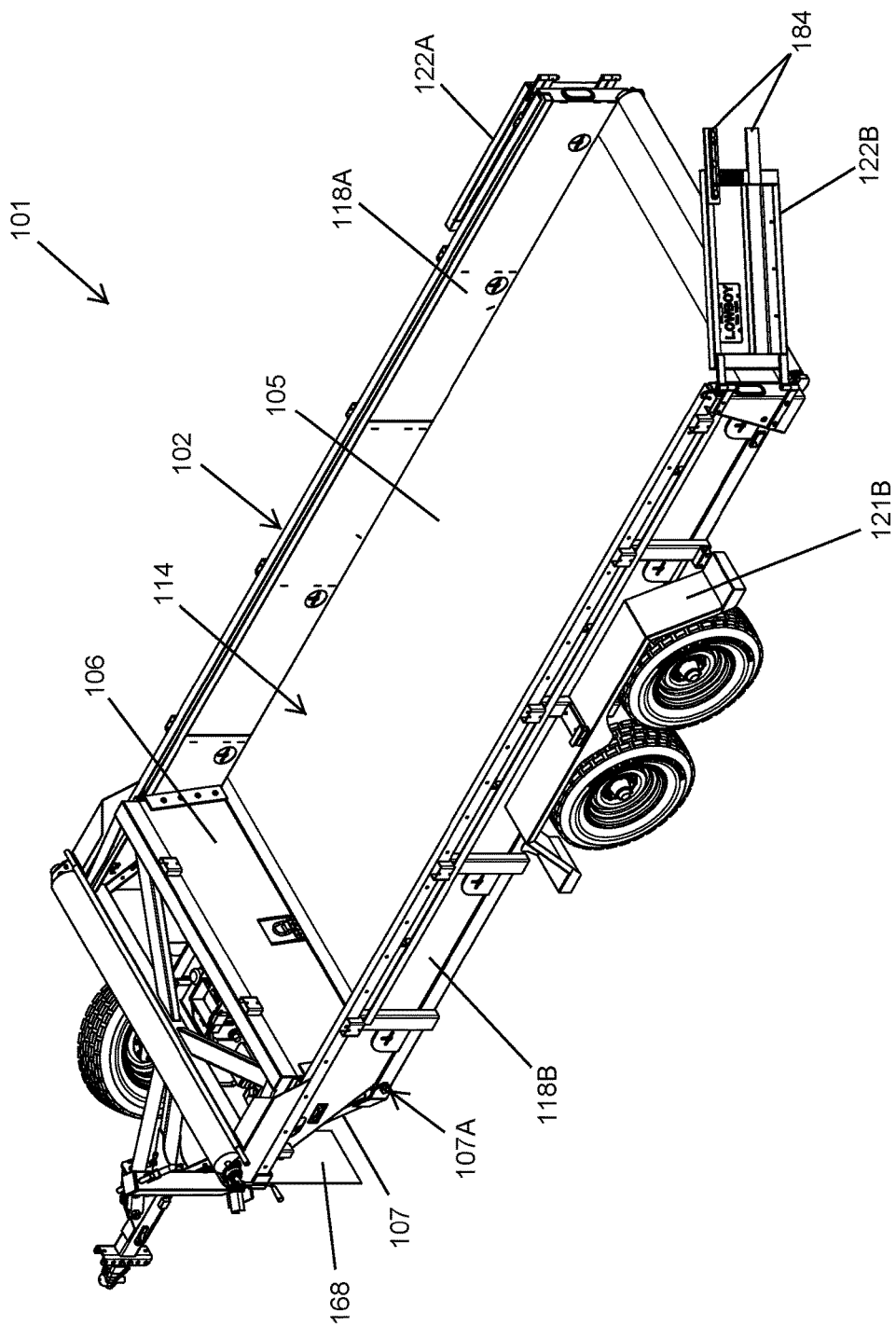
FIG. 21 is a three-quarter left-rear upper perspective view of the live-bed utility trailer of FIG. 20.

FIG. 21 shows the live bulkhead assembly 106, which is similar to the bulkhead assembly 6. The rear perspective view of FIG. 21 also shows a tailgate latch mechanism 184 that is provided with two members that connect between the doors 122A and 122B of the tailgate, as opposed to the single latch member extending from the door 22B shown in FIG. 2.

Figure 22:
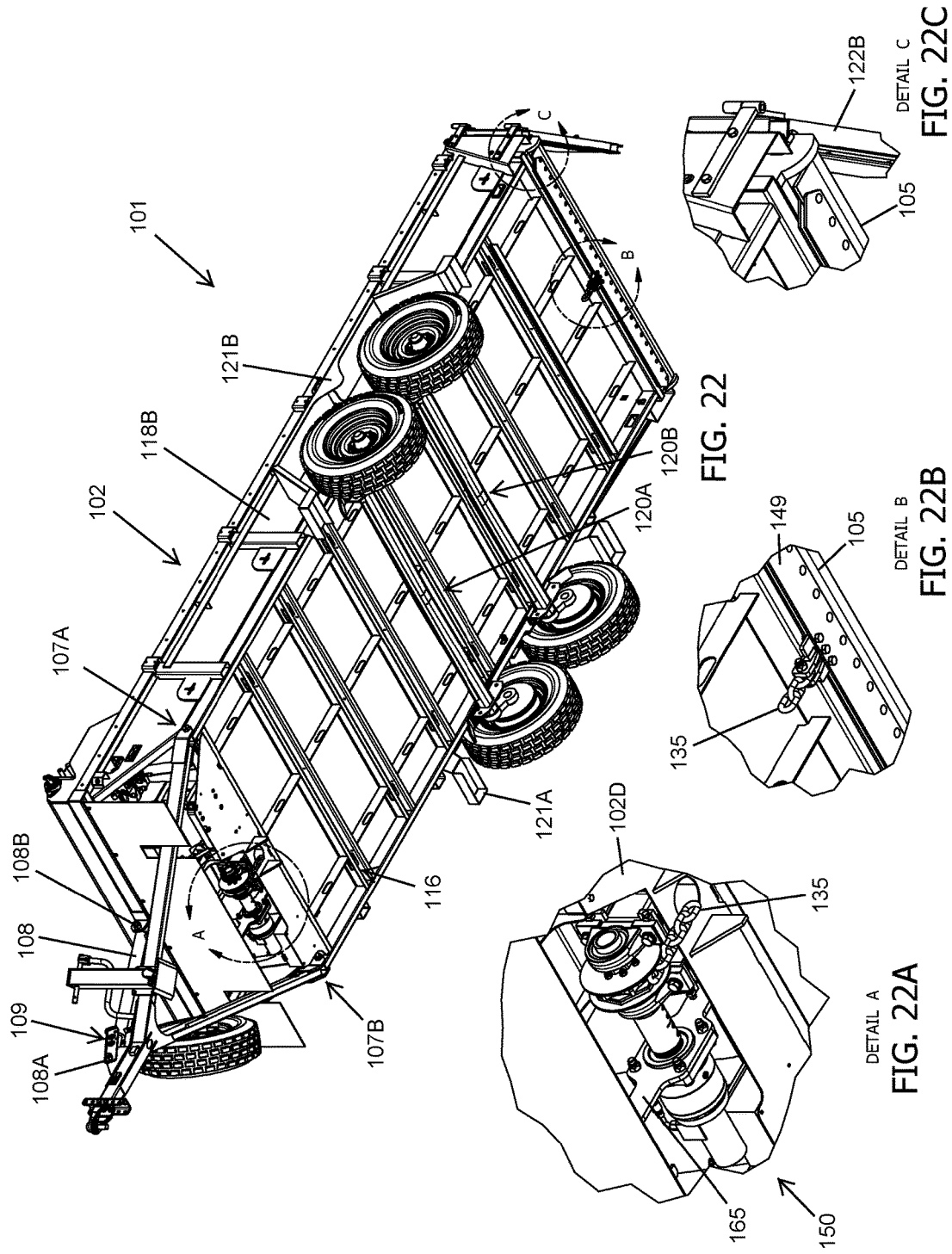
FIG. 22 is a three-quarter left-front lower perspective view of the live-bed utility trailer of FIG. 20.
Figures 24, 24A:
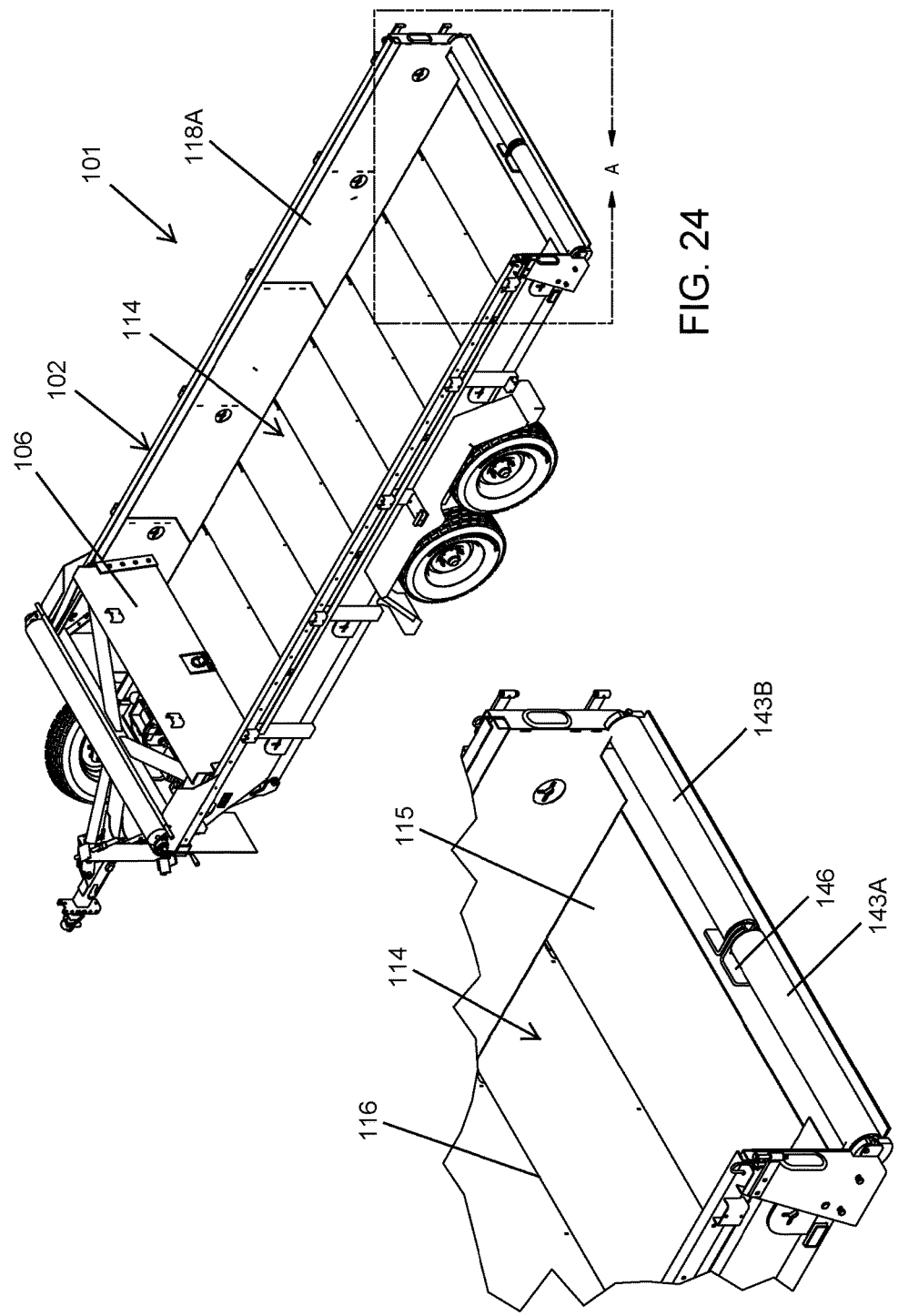
FIG. 24 is a three-quarter left-rear upper perspective view of the live-bed utility trailer of FIG. 20, shown with the live-bed flexible member removed.
FIG. 24A is a detailed perspective view of the rear portion of the live-bed utility trailer, taken at section A of FIG. 24.

FIGS. 22-22C show the underside of the trailer 101 and some features shown in enlarged detailed views. FIG. 22 also illustrates an additional longitudinal rib member extending along the center of the bed to support bed support surface 114 and the bed panels 115 (FIG. 24A). FIG. 22A shows a single chain live-bulkhead and floor drive system. Specifically, a single closed-link load chain 135 is shown extending between the front portion of the trailer 101, where the chain 135 wraps partially around a sprocket of the drive system (FIG. 22A), and the rear portion of the trailer 101, where the chain 135 is attached at the rearward end of live-bed flexible member 105 (FIG. 22B). The use of a single chain 135 is simpler than using multiple chains and eliminates possible issues with chain length and pitch-timing, load sharing and variation, and adjustment concerns between multiple separate load chains. FIG. 22C shows a revised structural configuration at the rear corner of the frame 102, which locates a corner frame piece outside the trailer side wall 118B to provide a supported attachment location for the laterally wider rear rollers of the trailer 112.

Figure 23:
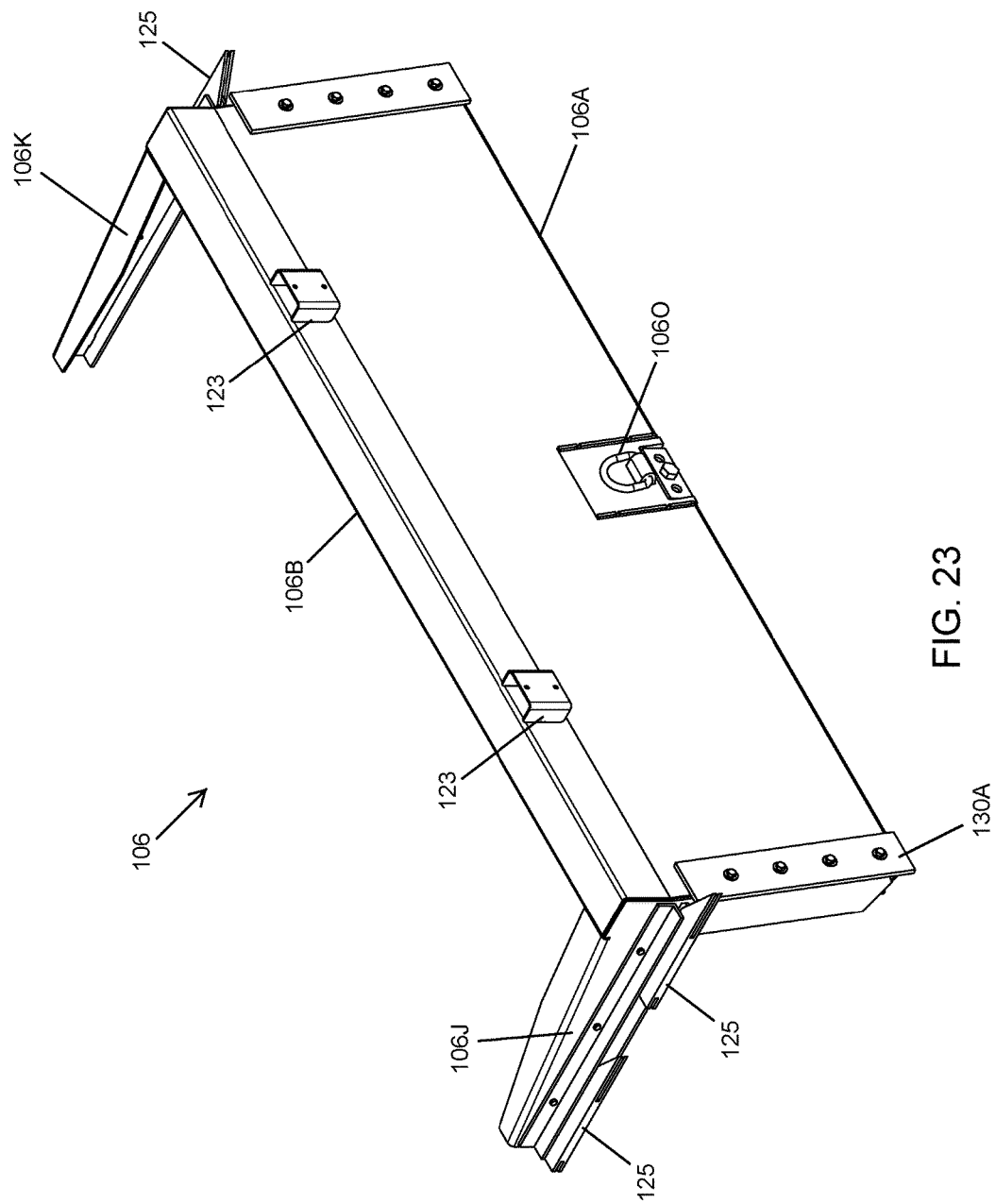
FIG. 23 is a three-quarter left-rear upper perspective view of a live-bulkhead assembly shown in FIG. 21.
Figures 23A, 23B:
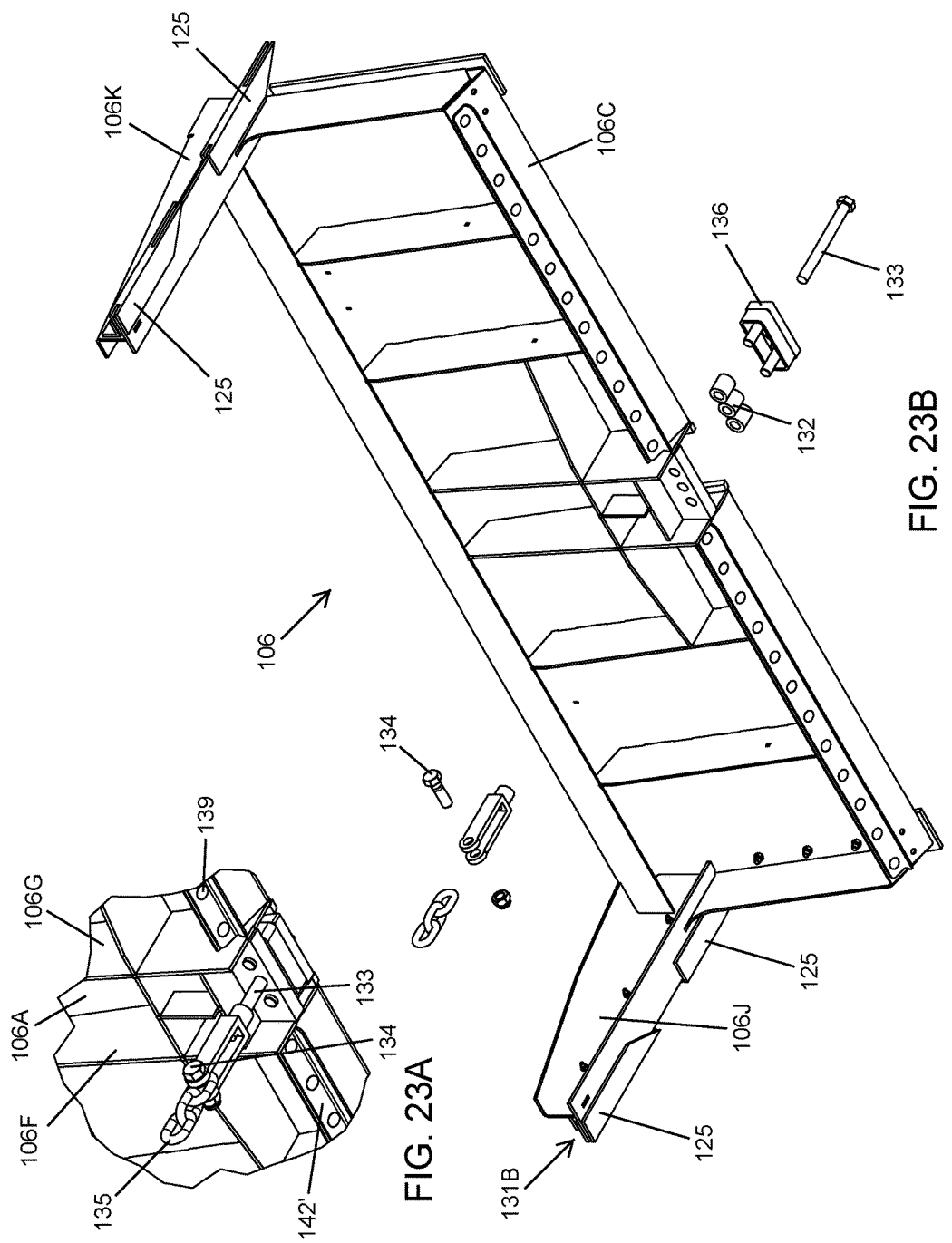
FIG. 23A is a detailed perspective view of the central portion of the live-bulkhead assembly shown in FIG. 23B.
FIG. 23B is a lower-left perspective view of the live-bulkhead assembly shown in FIG. 23, showing an exploded view of the drive chain clevis coupling and attachment components.

As shown in FIGS. 23-23B, the live bulkhead assembly 106 has a single chain attachment for the single closed-link load chain 135 (FIG. 23A). The live bulkhead assembly 106 also includes a pivotable bulkhead load pull ring 106O (FIG. 23). Optionally, and such as shown in FIG. 23B, three elastomer (urethane) springs 132 may be provided or installed between the drive chain load block 136 and the main plate 106A of the live bulkhead assembly 106. However, the rectangular weldment or drive chain load block 136 may simply contact directly against the bulkhead main plate 106.

FIGS. 24 and 24A show two rear rollers 143A, 143B without the live-bed flexible member 105 (FIG. 20), compared to three rear rollers on the trailer 1 shown in FIG. 1, such that the trailer 101 eliminates two bearings by eliminating a rear roller, thereby having four bearings 144 at the rear of the frame 102. FIGS. 24B-24E show an exploded view that illustrates the central "L-brackets" 146' welded to the frame 102 with a ¼ inch spacer plate 146" between. The outer profile of this spacer plate 146" is reduced about ¼ inch from the outer profile of the two L-brackets. This creates a preferable square groove for a full slot weld all around at the center. The two holes through all three parts simply provide proper alignment of the parts prior to welding. The vertical face of the C-shaped square opening is about ½ inch further rearward (outward) than the respective vertical faces of the corresponding C-shaped mounting plates 146 at the ends. Once all the parts are assembled, the square-tube shaft 145 is designed to pivot or otherwise "see-saw" in a horizontal plane parallel to the ground at the central support.

The left and right adjustment bolts 145A, 145B in FIG. 24E are fully-threaded bolts (including hex locknuts) engaged with threaded holes in the small square blocks that are then held within the ends of the square tube. The ends of the fully-threaded bolts 145A, 145B simply contact the vertical faces of the C-shaped mounting plates 146. There are no threaded holes as shown by item 46B in earlier FIG. 7B. Proper adjustment of the fully-threaded bolts 145A, 145B allows for control of the bending or deflection of the square-tube shaft 145 as it is under constant horizontal load in the direction toward the front of the trailer due to the belt (live-bed flexible member 105) tension. When correctly adjusted, the square tube shaft 145 is therefore crowned at the center to the rear, away from the trailer frame 102. This crowning effect is seen at the two rollers and helps to maintain proper left to right centering of the belt (live-bed flexible member 105) at all times. The adjustment bolts 145A, 145B are also readily accessible at the outside rear of the trailer in the illustrated embodiment of the trailer 101. The small cover plate 196 and bolt at each end simply covers the ends of the square tube shaft 145 and keeps it in place.

Figure 26:
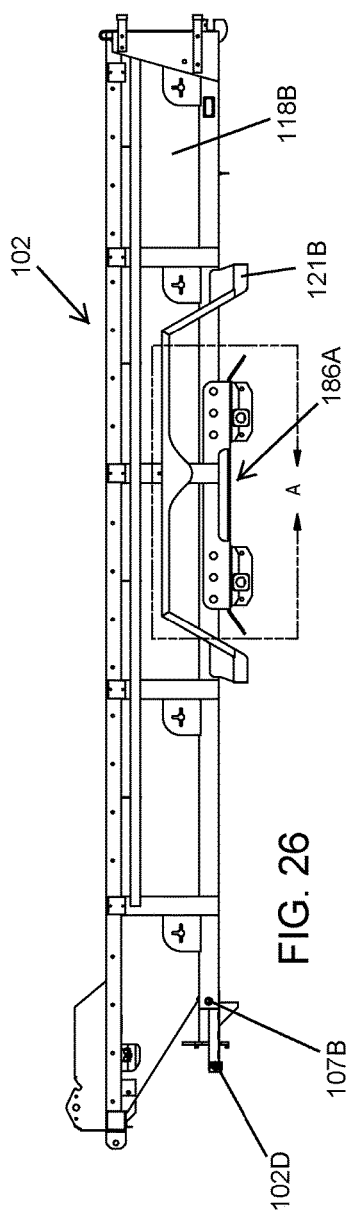
FIG. 26 is a left side elevational view of a trailer frame assembly of the live-bed utility trailer shown in FIG. 20.
Figure 26A:
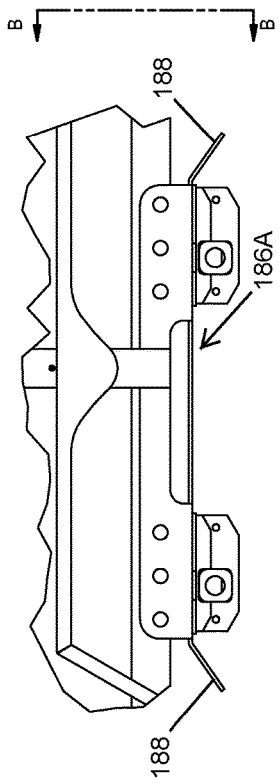
FIG. 26A is a detailed elevational view of a portion of the trailer frame assembly shown at section A of FIG. 26.
Figure 26C:
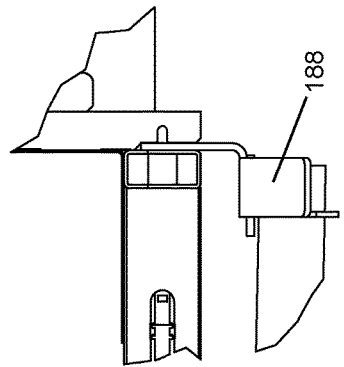
FIG. 26C is a detailed elevational view of a portion of the trailer frame assembly shown at section C of FIG. 26B.
Figure 26B:
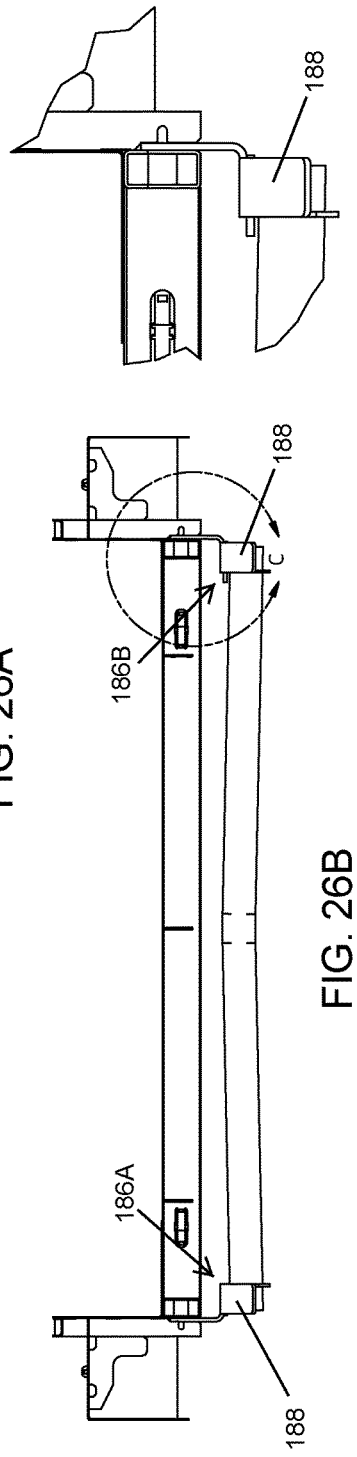
FIG. 26B is an end elevational view of the trailer frame assembly of the live-bed utility trailer shown in FIG. 26, taken in the direction B-B shown in FIG. 26A.

FIGS. 25-25C show an axle mounting system that incorporates a belt (live-bed flexible member 105) guide arrangement having respective left and right axle mounting brackets 186A, 186B provided with an inclined plate surfaces 188 that help ensure that the belt (live-bed flexible member not shown) is properly guided and supported over the axles 120A, 120B either when it is moving or when stationary. FIGS. 26-26C show detail views of the trailer frame 102 having the mounting brackets 186A, 186B. Also, FIGS. 27-27D show detailed views of the left side improved axle mounting bracket and belt (live-bed flexible member 105) guide 186A as it would appear prior to being welded into place on the main frame 102. There are a left and right hand versions 186A, 186B, each being a mirror image of the other. Four countersunk square holes 190 are provided to fasten the axle assemblies without having bolt heads interfere with the belt (live-bed flexible member 105).

Figure 28B:
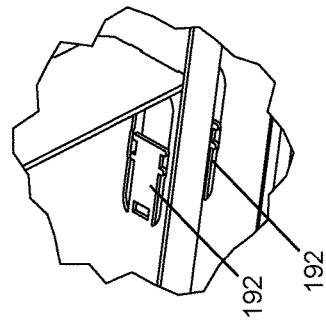
FIG. 28B is a detailed perspective view of a tab shown at section B of FIG. 28A.
Figure 28C:
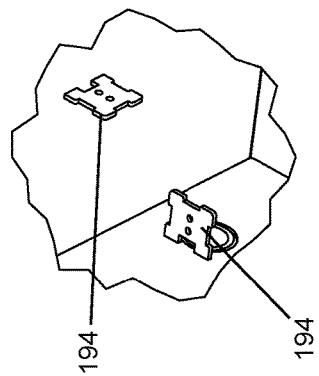
FIG. 28C is a detailed perspective view of tabs shown at section C of FIG. 28A.
Figure 28A:
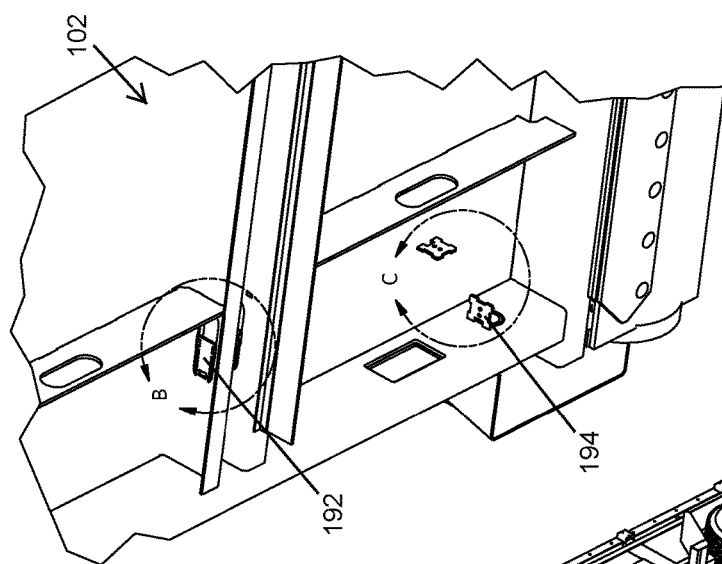
FIG. 28A is a detailed perspective view of tabs that can be bent outward at an angle and then used to support electrical harnesses and hydraulic lines when needed, taken at section A of FIG. 28.
Figure 28:
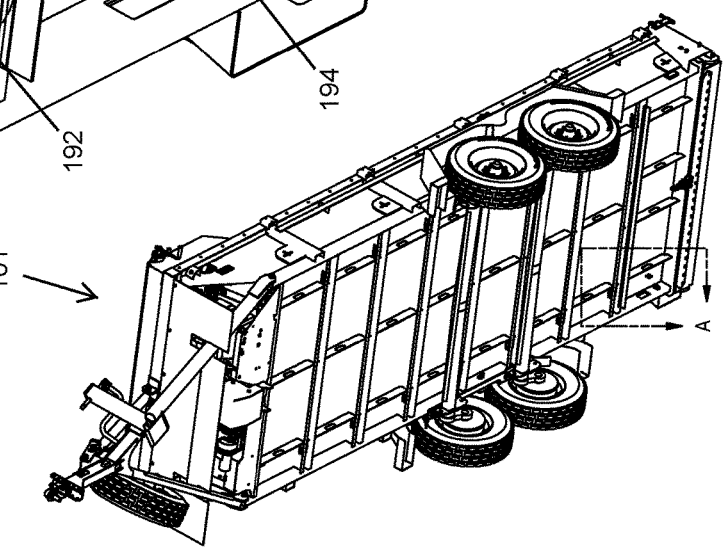
FIG. 28 is a three-quarter left-front lower perspective view of the live-bed utility trailer of FIG. 20.

As shown in FIGS. 28-28C, additional features may be provided at the underside of the trailer 101 for mounting or at least partially supporting electrical harnesses and hydraulic lines. FIG. 28B shows the use of laser-cutout features in the structural sheet metal for the purpose of producing a series of tabs 192 that can be bent outward at an angle and then used to support electrical harnesses and hydraulic lines where ever needed. FIG. 28C also shows individually laser-cut tabs 194 that are welded into place at various desired locations on the frame. The laser-cut bend-tabs 194 especially seem to offer a significant economic cost advantage for manufacturing and production assembly of the trailer 101.

The live-bed utility trailer 101 is otherwise generally similar to trailer 1, discussed above, such that a detailed discussion of the trailers need not be repeated herein. Trailer 101 is illustrated in FIGS. 20-28C with similar features having similar reference numbers used for trailer 1, but with "100" added to the reference numbers.

Changes and modifications in the specifically described embodiments may be carried out without departing from the principles of the present invention, which is intended to be limited only by the scope of the appended claims as interpreted according to the principles of patent law.

The invention claimed is:

1. A utility trailer with a movable bed floor, said utility trailer comprising:
a trailer frame including a first structural side wall and a second structural side wall opposing said first structural side wall, each of said first structural side wall and said second structural side wall extending along a length direction of said trailer;
a plurality of bed panels coupled with said trailer frame and defining an upper support surface, each of said bed panels extending from a first lateral end proximate to said first structural side wall to a second lateral end proximate to said second structural side wall, whereby adjacent ones of said bed panels are spaced apart from each other by an unobstructed gap extending across a width of said trailer frame from said first structural side wall to said second structural side wall;
a live-bed flexible member movable along the length direction of the trailer and having a length dimension that is at least as long as a length dimension of said upper support surface, wherein said live-bed flexible member comprises a flexible conveyor belt that provides a continuous flexible surface between forward and rearward ends thereof;
wherein side edge regions of said live-bed flexible member are movable along and under side cover plates at and along the lateral ends of said plurality of bed panels;
a load chain coupled between said forward and rearward ends of said live-bed flexible member and extending longitudinally below said plurality of bed panels; and
a drive system supported by said trailer frame, said drive system engaged with said load chain and operable to drive said load chain to move said live-bed flexible member in forward and rearward directions over said upper support surface for loading and unloading items.

2. The utility trailer of claim 1, wherein said live-bed flexible member extends laterally across the width of said upper support surface between said structural side walls of said trailer frame.

3. The utility trailer of claim 1, further comprising a bulkhead assembly coupled between said forward end of said live-bed flexible member and a rear end of said load chain, and wherein driving of said load chain moves said bulkhead with said forward end of said live-bed flexible member.

4. The utility trailer of claim 1, further comprising a drawbar assembly pivotally coupled with a front end of said trailer frame about a horizontal axis.

5. The utility trailer of claim 4, further comprising a linear adjustment device coupled between said drawbar assembly and said trailer frame and linearly actuatable to adjust the angle of said drawbar assembly relative to said trailer frame for adjusting a height of a rear of said trailer frame from a ground surface.

6. The utility trailer of claim 5, wherein said linear adjustment device comprises a hydraulic cylinder that is extendable to adjust a height of a rear of said trailer frame from a ground surface.

7. The utility trailer of claim 1, wherein said drive system includes a drive shaft having a non-circular portion and a modular sprocket slidably disposed on the non-circular portion, said modular sprocket engaged with said load chain and comprising:
a first chain drive sprocket segmented wheel;
a second chain drive sprocket segmented wheel; and
a chain drive sprocket toothed wheel having a plurality of teeth, said chain drive sprocket toothed wheel disposed immediately between said first chain drive sprocket segmented wheel and said second chain drive sprocket segmented wheel,
wherein a first link of said load chain receives a first one of said teeth of the chain drive sprocket toothed wheel and a subsequent second link of said load chain is received in a recess defined by said first chain drive sprocket segmented wheel and said second chain drive sprocket segmented wheel.

8. The utility trailer of claim 1, further comprising a tension device having a plurality of tension elements formed of a compressible urethane material that compresses responsive to an increase in tension in said load chain and said live-bed flexible member,
wherein said tension device adjusts responsive to changes in load on said live-bed flexible member caused by the items being loaded or unloaded.

9. The utility trailer of claim 8, further comprising a bulkhead assembly coupled between said forward end of said live-bed flexible member and the end of said load chain, and wherein driving of said load chain moves said live-bed flexible member and said bulkhead, and wherein said tension elements are disposed at said bulkhead assembly.

10. The utility trailer of claim 9, wherein said drive system comprises a motor that rotatably drives a sprocket to linearly drive said load chain and said live-bed flexible member, and wherein said motor is disposed at a forward end of said trailer and forward of said bulkhead.

11. A utility trailer with a movable bed floor, said utility trailer comprising:
a trailer frame including a first structural side wall and a second structural side wall opposing said first structural side wall, each of said first structural side wall and said second structural side wall extending along a length direction of said trailer and including an internal track formed within an upper most portion thereof;
a plurality of bed panels coupled with said trailer frame and defining an upper support surface, each of said bed panels extending from a first lateral end proximate to said first structural side wall to a second lateral end proximate to said second structural side wall, whereby adjacent ones of said bed panels are spaced apart from each other by an unobstructed gap extending across a width of said trailer frame from said first structural side wall to said second structural side wall;
a live-bed flexible member moveable along the length direction of the trailer and substantially spanning said upper support surface, wherein said live-bed flexible member comprises a flexible conveyor belt that provides a continuous flexible surface between forward and rearward ends thereof;
a drive system operable to drive said live-bed flexible member in forward and rearward directions over said upper support surface for loading and unloading items;
wherein said live-bed flexible member has a bulkhead disposed at said forward end thereof, said bulkhead extending from said first structural side wall to said second structural side wall and including a first slide bearing slidably received within said internal track of said first structural side wall and a second slide bearing slidably received within said internal track of said second structural side wall;

wherein side edge regions of said live-bed flexible member are movable along and under side cover plates at and along the lateral ends of said plurality of bed panels; and wherein said drive system comprises a motor that rotatably drives a sprocket to linearly drive a load chain that is connected at said bulkhead and said rearward end of said live-bed flexible member.

12. The utility trailer of claim 11, wherein said load chain extends longitudinally below said bed panel when said live-bed flexible member spans said upper surface of said bed panel.

13. The utility trailer of claim 11, comprising a tension device that adjusts responsive to change in tension in said load chain and said live-bed flexible member.

14. The utility trailer of claim 13, wherein said tension device comprises a plurality of biasing elements disposed at connecting elements that connect said forward end of said live-bed flexible member and an end of said load chain.

15. The utility trailer of claim 11, wherein said bulkhead includes a first slide angle guide configured to engage an upper portion of said first structural side wall and a second slide angle guide configured to engage an upper portion of said second structural side wall.

16. The utility trailer of claim 11, wherein the bulkhead comprises:
   a first flexible wiper seal contacting an inner surface of said first structural side wall;
   a second flexible wiper seal contacting an inner surface of said second structural side wall;
   a first corner scraper guide plate contacting said inner surface of said first structural side wall and an upper surface of a first one of said side cover plates; and
   a second corner scraper guide plate contacting said inner surface of said second structural side wall and an upper surface of a second one of said side cover plates.

17. The utility trailer of claim 11, wherein said bulkhead includes a chain coupling for connecting said bulkhead to a first end of said load chain, said chain coupling movable along the length direction of the trailer between a first position and a second position relative to the bulkhead, and including a urethane tension element configured to bias the chain coupling towards the first position.

* * * * *